(12) United States Patent
Lo et al.

(10) Patent No.: US 8,576,865 B1
(45) Date of Patent: *Nov. 5, 2013

(54) PHYSICAL LAYER DEVICES FOR NETWORK SWITCHES

(75) Inventors: William Lo, Cupertino, CA (US); Sehat Sutardja, Los Altos Hills, CA (US)

(73) Assignee: Marvell International Ltd., Hamilton (BM)

( * ) Notice: Subject to any disclaimer, the term of this patent is extended or adjusted under 35 U.S.C. 154(b) by 214 days.

This patent is subject to a terminal disclaimer.

(21) Appl. No.: 13/174,096

(22) Filed: Jun. 30, 2011

Related U.S. Application Data

(62) Division of application No. 13/155,085, filed on Jun. 7, 2011.

(60) Provisional application No. 61/352,105, filed on Jun. 7, 2010.

(51) Int. Cl.
*H04L 12/28* (2006.01)
*H04L 12/56* (2011.01)
*H04L 12/66* (2006.01)

(52) U.S. Cl.
USPC .......................................... 370/419; 370/463

(58) Field of Classification Search
USPC ................................................. 370/419, 463
See application file for complete search history.

(56) References Cited

U.S. PATENT DOCUMENTS

| | | | |
|---|---|---|---|
| 4,566,102 A | 1/1986 | Hefner | |
| 4,882,687 A | 11/1989 | Gordon | |
| 4,933,895 A | 6/1990 | Grinberg et al. | |
| 5,072,379 A | 12/1991 | Eberhardt | |
| 5,204,836 A | 4/1993 | Reed | |
| 5,423,024 A | 6/1995 | Cheung | |
| 5,530,798 A | 6/1996 | Chu et al. | |
| 5,634,067 A | 5/1997 | Nagazumi | |
| 5,655,069 A | 8/1997 | Ogawara et al. | |
| 5,737,766 A | 4/1998 | Tan | |
| 5,748,872 A | 5/1998 | Norman | |

(Continued)

FOREIGN PATENT DOCUMENTS

| CN | 1148895 A | 4/1997 |
|---|---|---|
| EP | 0361404 A2 | 4/1990 |

(Continued)

OTHER PUBLICATIONS

Communication dated Dec. 16, 2010 from the Taiwan Patent Office for Taiwanese Patent Application No. 093127283, 2 pages.

(Continued)

*Primary Examiner* — Ronald Abelson

(57) ABSTRACT

A switch includes a first IC and a second IC. The first IC includes a first set of (N+1) serializer/deserializer (SERDES) modules communicating with a first set of (N+1) SERDES modules of a switch IC; a first set of N SERDES modules communicating with a first set of N ports; and a first set of N multiplexer modules communicating with (i) the first set of N SERDES modules and (ii) the first set of (N+1) SERDES modules of the first IC. The second IC includes a second set of (N+1) SERDES modules communicating with a second set of (N+1) SERDES modules of the switch IC; a second set of N SERDES modules communicating with a second set of N ports; and a second set of N multiplexer modules communicating with (i) the second set of N SERDES modules and (ii) the second set of (N+1) SERDES modules of the second IC.

10 Claims, 11 Drawing Sheets

(56) References Cited

U.S. PATENT DOCUMENTS

| | | | |
|---|---|---|---|
| 5,896,370 | A | 4/1999 | Eckhoff et al. |
| 6,021,512 | A | 2/2000 | Lattimore et al. |
| 6,047,122 | A | 4/2000 | Spiller |
| 6,091,258 | A | 7/2000 | McClintock et al. |
| 6,145,072 | A | 11/2000 | Shams et al. |
| 6,256,758 | B1 | 7/2001 | Abramovici et al. |
| 6,337,817 | B1 | 1/2002 | Horiguchi et al. |
| 6,363,021 | B2 | 3/2002 | Noh |
| 6,526,461 | B1 | 2/2003 | Cliff |
| 6,618,819 | B1 | 9/2003 | Adamovits et al. |
| 6,697,979 | B1 | 2/2004 | Vorbach et al. |
| 6,775,529 | B1 | 8/2004 | Roo |
| 6,785,841 | B2 | 8/2004 | Akrout et al. |
| 6,816,143 | B1 | 11/2004 | Lambert |
| 7,117,389 | B2 | 10/2006 | Luick |
| 2002/0133690 | A1 | 9/2002 | Yano et al. |
| 2003/0005377 | A1 | 1/2003 | Debenham |
| 2003/0177425 | A1 | 9/2003 | Okin |
| 2004/0080512 | A1 | 4/2004 | McCormack et al. |
| 2004/0123181 | A1 | 6/2004 | Moon et al. |
| 2004/0153754 | A1 | 8/2004 | Chen et al. |
| 2004/0177298 | A1 | 9/2004 | Farnworth et al. |
| 2004/0193939 | A1 | 9/2004 | Tanaka et al. |
| 2005/0078115 | A1 | 4/2005 | Buchmeier et al. |

FOREIGN PATENT DOCUMENTS

| | | |
|---|---|---|
| EP | 0 398 552 | 11/1990 |
| EP | 1170666 A2 | 1/2002 |
| JP | S49026270 | 3/1974 |
| JP | H10-187552 | 7/1998 |
| JP | 2001-527218 A | 12/2001 |
| WO | WO-99/32975 | 1/1999 |
| WO | WO-01/39163 | 5/2001 |

OTHER PUBLICATIONS

Communication dated Jul. 15, 2011 from the Japanese Patent Office for Japanese Patent Application No. 2003-380433, 1 page.

Communication dated Jun. 6, 2005 from the European Patent Office for European Patent; Application No. 03026882.5-2211.

IBM Technical Disclosure Bulletin, Yield and Reliability Enhancement Via Redundancy for; VLSI Chips and Wafers, Jun. 1, 1985, pp. 1 and 2.

Notification of First Office Action dated Nov. 25, 2005 for Chinese Patent Application; No. 03134804.1; 7 pages.

Notification of First Office Action from the State Intellectual Property Office of PRC dated; Mar. 23, 2007 for Chinese Application No. 200410073737.2; 7 pages.

Notification of Second Office Action from the State Intellectual Property Office of PRC; dated Sep. 7, 2007 for Chinese Patent Application No. 2004/1 0073737.2; 7 pages.

Notification of Third Office Action from the State Intellectual Property Office of PRC dated; Aug. 8, 2008 for Chinese Patent Application No. 2004/1 0073737.2; 9 pages.

Wang, Minghsien; Cutler, Michel; Su, Stephen Y.H.; Reconfiguration of VLSI/WSI Mesh; Array Processors with Two-Level Redundancy, 1989, IEEE, pp. 547-550.

– 1 –

PHYSICAL LAYER DEVICES FOR NETWORK SWITCHES

CROSS-REFERENCE TO RELATED APPLICATIONS

This application is a divisional of U.S. patent application Ser. No. 13/155,085 filed on Jun. 7, 2011. This application claims the benefit of U.S. Provisional Application No. 61/352,105, filed on Jun. 7, 2010.

This application is related to U.S. Non-Provisional application Ser. No. 10/358,709 (now U.S. Pat. No. 7,185,225) filed Feb. 5, 2003; U.S. Non-Provisional application Ser. No. 10/892,707 (now U.S. Pat. No. 7,340,644) filed Jul. 16, 2004; U.S. Non-Provisional application Ser. No. 11/196,651 filed Aug. 3, 2005; U.S. Non-Provisional application Ser. No. 11/594,312 (now U.S. Pat. No. 7,313,723) filed Nov. 8, 2006; U.S. Non-Provisional application Ser. No. 11/594,390 (now U.S. Pat. No. 7,373,547) filed Nov. 8, 2006; U.S. Non-Provisional application Ser. No. 11/594,537 (now U.S. Pat. No. 7,657,784) filed Nov. 8, 2006; U.S. Non-Provisional application Ser. No. 12/074,557 (now U.S. Pat. No. 7,730,349) filed Mar. 4, 2008

The disclosures of the above applications are incorporated herein by reference in their entirety.

FIELD

The present disclosure relates to network switches.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A network switch (hereinafter switch) is a networking device that interconnects segments of a network. A large switch can have a large number of ports (e.g., more than one hundred ports). In a large switch, most of the circuitry, including circuits that support the ports and circuits that control the operation of the network switch, is often integrated into an integrated circuit (IC). If a circuit in the IC (e.g., a circuit supporting a port) malfunctions, the IC is typically discarded.

SUMMARY

A first integrated circuit (IC) comprises a first set of M serializer/deserializer (SERDES) modules, a first set of N SERDES modules, and a first set of N multiplexer modules, where M is an integer greater than 1, and N=(M−1). The first set of M SERDES modules is configured to communicate with a first set of M SERDES modules of a switch IC of a switch, respectively. The first set of N SERDES modules is configured to communicate with a first set of N ports of the switch, respectively. The first set of N multiplexer modules is configured to communicate with (i) the N SERDES modules in the first set of N SERDES modules, respectively, and (ii) the M SERDES modules in the first set of M SERDES modules of the first IC. Each of the N multiplexer modules is configured to communicate with a pair of SERDES modules in the first set of M SERDES modules of the first IC.

In another feature, the first IC further comprises a first management module configured to receive first data from the switch IC to control the N multiplexer modules, wherein each of the N multiplexer modules is configured, based on the first data, to route data between (i) a corresponding one of the N SERDES modules and (i) one SERDES module from the corresponding pair of SERDES modules in the first set of M SERDES modules of the first IC.

In another feature, a system comprises the first IC and a second IC. The second IC includes a second set of M SERDES modules configured to communicate with a second set of M SERDES modules of the switch IC, respectively. The second IC includes a second set of N SERDES modules configured to communicate with a second set of N ports of the switch, respectively. The second IC includes a second set of N multiplexer modules configured to communicate with (i) the N SERDES modules in the second set of N SERDES modules, respectively, and (ii) the M SERDES modules in the second set of M SERDES modules of the second IC. Each multiplexer module in the second set of N multiplexer modules is configured to communicate with a pair of SERDES modules in the second set of M SERDES modules of the second IC. The second IC includes a second management module configured to receive second data from the switch IC to control the second set of N multiplexer modules. Each multiplexer module in the second set of N multiplexer modules is configured, based on the second data, to route data between (i) a corresponding one of the N SERDES modules in the second set of N SERDES modules and (ii) one SERDES module from the corresponding pair of SERDES modules in the second set of M SERDES modules of the second IC.

In another feature, a switch comprises the system, and the switch IC includes a mapping module. The mapping module is configured to map the first set of M SERDES modules of the switch IC to the first set of N ports of the switch according to a first mapping, and map the second set of M SERDES modules of the switch IC to the second set of N ports of the switch according to a second mapping. The mapping module is configured to send the first data corresponding to the first mapping to the first management module, and send the second data corresponding to the second mapping to the second management module.

In another feature, the switch IC further comprises a failure detection module configured to detect when one SERDES module fails in (i) the first set of M SERDES modules of the switch IC or (ii) the second set of M SERDES modules of the switch IC. If one SERDES module fails in the first set of M SERDES modules of the switch IC, the mapping module is further configured to (i) remap the first set of M SERDES modules of the switch IC to the first set of N ports of the switch according to a third mapping and (ii) send the first data corresponding to the third mapping to the first management module. If one SERDES module fails in the second set of M SERDES modules of the switch IC, the mapping module is further configured to (i) remap the second set of M SERDES modules of the switch IC to the second set of N ports of the switch according to a fourth mapping and (ii) send the second data corresponding to the fourth mapping to the second management module.

In another feature, a system comprises the first IC and a second IC. The second IC includes a second set of M SERDES modules, wherein (M−1) of the second set of M SERDES modules are configured to communicate with a second set of (M−1) SERDES modules of the switch IC, respectively. The second IC includes a second set of N SERDES modules configured to communicate with a second set of N ports of the switch, respectively. The second IC includes a second set of N multiplexer modules configured to communicate with (i) the N SERDES modules in the second set of N SERDES modules, respectively, and (ii) the M SERDES modules in the second set of M SERDES modules of the second IC. Each multiplexer module in the second set of N multiplexer modules is configured to communicate with a pair of SERDES modules in the second set of M SERDES modules of the second IC. The second IC includes a second management module configured to receive second data from the switch IC to control the second set of N multiplexer modules. Each multiplexer module in the second set of N multiplexer modules is configured, based on the second data, to route data between (i) a corresponding one of the N SERDES modules in the second set of N SERDES modules and (ii) one SERDES module from the corresponding pair of SERDES modules in the second set of M SERDES modules of the second IC.

In another feature, the first IC further comprises an $(M+1)^{th}$ SERDES module configured to communicate with (i) an $M^{th}$ SERDES module in the first set of M SERDES modules of the first IC, (ii) a first SERDES module in the second set of M SERDES modules of the second IC, and (iii) an $N^{th}$ multiplexer module of the first set of N multiplexer modules of the first IC. The first SERDES module in the second set of M SERDES modules of the second IC is configured to (i) communicate with a first multiplexer module in the second set of N multiplexer modules and (ii) not communicate with the second set of (M−1) SERDES modules of the switch IC. The second IC further comprises an $(M+1)^{th}$ SERDES module configured to communicate with (i) an $M^{th}$ SERDES module in the second set of M SERDES modules of the second IC and (ii) an $N^{th}$ multiplexer module of the second set of N multiplexer modules of the second IC.

In another feature, a switch comprises the system and the switch IC. A first SERDES module in the first set of M SERDES modules of the switch IC is a spare SERDES module. A first SERDES module in the first set of M SERDES modules of the first IC is configured to communicate with (i) the spare SERDES module and (ii) a first multiplexer module in the first set of N multiplexer modules.

In another feature, the switch IC further comprises a mapping module configured to map the first set of M SERDES modules of the switch IC to the first set of N ports of the switch according to a first mapping, map the second set of (M−1) SERDES modules of the switch IC to the second set of N ports of the switch according to a second mapping, send the first data corresponding to the first mapping to the first management module, and send the second data corresponding to the second mapping to the second management module.

In another feature, the switch IC further comprises a failure detection module configured to detect when one SERDES module fails in (i) the first set of M SERDES modules of the switch IC or (ii) the second set of (M−1) SERDES modules of the switch IC. If one SERDES module fails in the first set of M SERDES modules of the switch IC, the mapping module is further configured to (i) remap the first set of M SERDES modules of the switch IC to the first set of N ports of the switch according to a third mapping and (ii) send the first data corresponding to the third mapping to the first management module. If one SERDES module fails in the second set of (M−1) SERDES modules of the switch IC, the mapping module is further configured to (i) remap, according to a fourth mapping, the first set of M SERDES modules of the switch IC and the second set of (M−1) SERDES modules of the switch IC to the first set of N ports of the switch and the second set of N ports of the switch and (ii) send the first data and the second data corresponding to the fourth mapping to the first management module and the second management module, respectively.

In another feature, the first IC further comprises a first set of N delay modules configured to communicate with (i) the first set of N SERDES modules and (ii) the first set of N multiplexer modules, respectively. The second IC further comprises a second set of N delay modules configured to communicate with (i) the second set of N SERDES modules and (ii) the second set of N multiplexer modules, respectively. The first management module is further configured to activate or deactivate the first set of N delay modules based on the first data. The second management module is further configured to activate or deactivate the second set of N delay modules based on the second data.

In another feature, a system comprises the first IC and a second IC. The second IC includes a second set of (M−1) SERDES modules configured to communicate with a second set of (M−1) SERDES modules of the switch IC, respectively. The second IC includes a second set of N SERDES modules configured to communicate with a second set of N ports of the switch, respectively. The second IC includes a second set of N multiplexer modules configured to communicate with (i) the N SERDES modules in the second set of N SERDES modules, respectively, and (ii) the (M−1) SERDES modules in the second set of (M−1) SERDES modules of the second IC. Each multiplexer module, except a first multiplexer module, in the second set of N multiplexer modules is configured to communicate with a pair of SERDES modules in the second set of (M−1) SERDES modules of the second IC. The first multiplexer module in the second set of N multiplexer modules is configured to communicate directly with (i) a first SERDES module in the second set of (M−1) SERDES modules of the second IC, (ii) an $M^{th}$ SERDES module in the first set of M SERDES modules of the first IC, and (iii) an $N^{th}$ multiplexer module in the first set of N multiplexer modules of the first IC.

In another feature, the system further comprises a second management module configured to receive second data from the switch IC to control the second set of N multiplexer modules. Each multiplexer module, except the first multiplexer module, in the second set of N multiplexer modules is configured, based on the second data, to route data between (i) a corresponding one of the N SERDES modules in the second set of N SERDES modules and (ii) one SERDES module from the corresponding pair of SERDES modules in the second set of (M−1) SERDES modules of the second IC. The first multiplexer module in the second set of N multiplexer modules is configured, based on the second data, to route data between a first SERDES module in the second set of N SERDES modules and (i) the first SERDES module in the second set of (M−1) SERDES modules of the second IC or (ii) the $M^{th}$ SERDES module in the first set of M SERDES modules of the first IC.

In another feature, a switch comprises the system and the switch IC. A first SERDES module in the first set of M SERDES modules of the switch IC is a spare SERDES module. A first SERDES module in the first set of M SERDES modules of the first IC is configured to communicate with (i) the spare SERDES module and (ii) a first multiplexer module in the first set of N multiplexer modules.

In another feature, the switch IC further comprises a mapping module configured to map the first set of M SERDES modules of the switch IC to the first set of N ports of the switch according to a first mapping, map the second set of (M−1) SERDES modules of the switch IC to the second set of N ports of the switch according to a second mapping, send the first data corresponding to the first mapping to the first management module, and send the second data corresponding to the second mapping to the second management module.

In another feature, the switch IC further comprises a failure detection module configured to detect when one SERDES module fails in (i) the first set of M SERDES modules of the switch IC or (ii) the second set of (M−1) SERDES modules of the switch IC. If one SERDES module fails in the first set of M SERDES modules of the switch IC, the mapping module is further configured to (i) remap the first set of M SERDES modules of the switch IC to the first set of N ports of the switch according to a third mapping and (ii) send the first data corresponding to the third mapping to the first management module. If one SERDES module fails in the second set of (M−1) SERDES modules of the switch IC, the mapping module is further configured to (i) remap, according to a fourth mapping, the first set of M SERDES modules of the switch IC and the second set of (M−1) SERDES modules of the switch IC to the first set of N ports of the switch and the second set of N ports of the switch and (ii) send the first data and the second data corresponding to the fourth mapping to the first management module and the second management module, respectively.

In still other features, a system comprises a first integrated circuit (IC) and a second IC. The first IC includes a first set of (N+1) serializer/deserializer (SERDES) modules configured to communicate with a first set of (N+1) SERDES modules of a switch IC of a switch, respectively, where N is an integer greater than 1. The first IC includes a first set of N SERDES modules configured to communicate with a first set of N ports of the switch, respectively. The first IC includes a first set of N multiplexer modules configured to communicate with (i) the N SERDES modules in the first set of N SERDES modules, respectively, and (ii) the (N+1) SERDES modules in the first set of (N+1) SERDES modules of the first IC. Each of the N multiplexer modules is configured to communicate with a pair of SERDES modules in the first set of (N+1) SERDES modules of the first IC. The second IC includes a second set of (N+1) SERDES modules configured to communicate with a second set of (N+1) SERDES modules of the switch IC, respectively. The second IC includes a second set of N SERDES modules configured to communicate with a second set of N ports of the switch, respectively. The second IC includes a second set of N multiplexer modules configured to communicate with (i) the N SERDES modules in the second set of N SERDES modules, respectively, and (ii) the (N+1) SERDES modules in the second set of (N+1) SERDES modules of the second IC. Each multiplexer module in the second set of N multiplexer modules is configured to communicate with a pair of SERDES modules in the second set of (N+1) SERDES modules of the second IC.

In another feature, a first SERDES module in each of (i) the first set of (N+1) SERDES modules of the switch IC and (ii) the second set of (N+1) SERDES modules of the switch IC is a spare SERDES module. A first SERDES module in the first set of (N+1) SERDES modules of the first IC is configured to communicate with (i) the spare SERDES module in the first set of (N+1) SERDES modules of the switch IC and (ii) a first multiplexer module in the first set of N multiplexer modules. A first SERDES module in the second set of (N+1) SERDES modules of the first IC is configured to communicate with (i) the spare SERDES module in the second set of (N+1) SERDES modules of the switch IC and (ii) a first multiplexer module in the second set of N multiplexer modules.

In another feature, the first IC further comprises a first management module configured to receive first data from the switch IC to control the first set of N multiplexer modules. Each of the N multiplexer modules in the first set of N multiplexer modules is configured, based on the first data, to route data between (i) a corresponding one of the N SERDES modules in the first set of N SERDES modules and (i) one SERDES module from the corresponding pair of SERDES modules in the first set of (N+1) SERDES modules of the first IC. The second IC further comprises a second management module configured to receive second data from the switch IC to control the second set of N multiplexer modules. Each multiplexer module in the second set of N multiplexer modules is configured, based on the second data, to route data between (i) a corresponding one of the N SERDES modules in the second set of N SERDES modules and (ii) one SERDES module from the corresponding pair of SERDES modules in the second set of (N+1) SERDES modules of the second IC.

In another feature, a switch comprises the system and the switch IC including a mapping module. The mapping module is configured to map, if no SERDES module fails in the first set of (N+1) SERDES modules of the switch IC, SERDES modules except the spare SERDES module in the first set of (N+1) SERDES modules of the switch IC to the first set of N ports of the switch according to a first mapping. The mapping module is configured to map, if no SERDES module fails in the second set of (N+1) SERDES modules of the switch IC, SERDES modules except the spare SERDES module in the second set of (N+1) SERDES modules of the switch IC to the second set of N ports of the switch according to a second mapping. The mapping module is configured to send the first data corresponding to the first mapping to the first management module and send the second data corresponding to the second mapping to the second management module.

In another feature, the switch IC further comprises a failure detection module configured to detect when one SERDES module fails in (i) the first set of (N+1) SERDES modules of the switch IC or (ii) the second set of (N+1) SERDES modules of the switch IC. If one SERDES module fails in the first set of (N+1) SERDES modules of the switch IC, the mapping module is further configured to (i) remap remaining SERDES modules in the first set of (N+1) SERDES modules of the switch IC to the first set of N ports of the switch according to a third mapping and (ii) send the first data corresponding to the third mapping to the first management module. If one SERDES module fails in the second set of (N+1) SERDES modules of the switch IC, the mapping module is further configured to (i) remap remaining SERDES modules in the second set of (N+1) SERDES modules of the switch IC to the second set of N ports of the switch according to a fourth mapping and (ii) send the second data corresponding to the fourth mapping to the second management module.

In still other features, a switch comprises a first set of M serializer/deserializer (SERDES) modules and a control module. The first set of M serializer/deserializer (SERDES) modules of the switch is configured to communicate with a first set of M ports of the switch, respectively. The first set of M ports transfers data at a rate R1 when no SERDES module fails in the first set of M SERDES modules, where M is an integer greater than 1. The control module is configured to increase the rate R1 to R2 when one of the M SERDES modules fails.

In another feature, $R2=(M*R1/(M-1))$.

In another feature, the switch further comprises a second set of N SERDES modules of the switch configured to communicate with a second set of N ports of the switch, respectively. The second set of N ports transfers data at a rate R3 when no SERDES module fails in the second set of N SERDES modules, where N is an integer greater than 1. The control module is configured to increase the rate R3 to R4 when one of the N SERDES modules fails. R4=(N*R3/(N−1)).

In another feature, M=N, R1=R3, and R2=R4.

In another feature, M, R1, and R2 are different than N, R3, and R4, respectively.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1A:
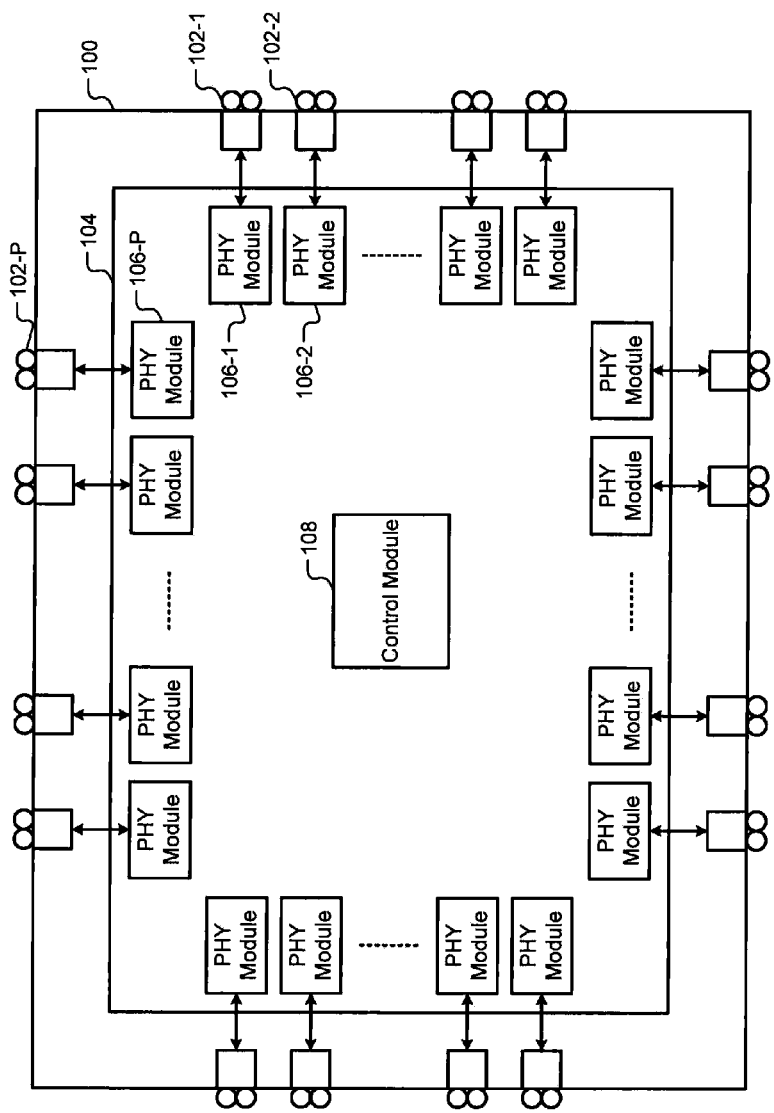
FIG. 1A is a functional block diagram of a network switch.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Figure 1B:
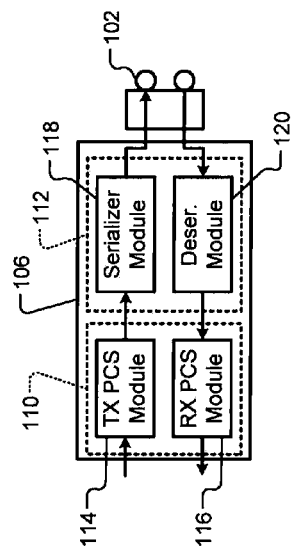
FIG. 1B is a functional block diagram of a physical layer (PHY) module of the network switch of FIG. 1.

Referring now to FIGS. 1A and 1B, a network switch (hereinafter switch) 100 is shown. Throughout the present disclosure, switches are shown and described as being used in a fiber optic network for example only. The teachings and general principles of the present disclosure, however, are applicable to switches used in other types of networks (e.g., an Ethernet network).

In FIG. 1A, the switch 100 includes a plurality of fiber optic ports 102-1, 102-2, . . . , and 102-P (collectively ports 102), where P is an integer greater than 1. The switch 100 includes an integrated circuit (IC) 104 (hereinafter switch IC 104) that includes circuitry for supporting the ports 102 and circuitry for controlling the operation of the switch 100.

Specifically, the switch IC 104 includes a plurality of physical layer (PHY) modules 106-1, 106-2, . . . , and 106-P (collectively PITY modules 106) that communicate with the ports 102, respectively. The switch IC 104 includes a control module 108 that controls the operation of the switch 100. The control module 108 communicates with the PHY modules 106 although connections between the control module 108 and the PHY modules 106 are omitted for simplicity of illustration. The control module 108 may include one or more medium access control (MAC) modules (not shown) that communicate with the PHY modules 106.

In FIG. 1B, one of the PHY modules 106 is shown in detail. The following description of the PHY module 106 applies to all the PHY modules 106. The PHY module 106 includes a physical coding sublayer (PCS) module 110 and a serializer/deserializer (SERDES) module 112. The PCS module 110 includes a transmit (TX) PCS module 114 and a receive (RX) PCS module 116. The SERDES module 112 includes a serializer module 118 and a deserializer module 120. The serializer module 118 communicates with the TX PCS module 114. The deserializer module 120 communicates with the RX PCS module 116.

The TX PCS module 114 receives from the control module 108 (e.g., from a MAC module included in the control module 108) data to be transmitted via the port 102. The TX PCS module 114 may encode the data using an 8 bit/10 bit encoding, for example. The serializer module 118 converts the encoded data from a parallel format to a serial format. The serial data is output via the port 102.

Serial data transmitted by another device on the fiber optic network is received by the deserializer module 120 via the port 102. The deserializer module 120 converts the serial data to parallel data. The RX PCS module 116 may decode the data using an 8 bit/10 bit decoding, for example. The RX PCS module 116 outputs the decoded data to the control module 108 (e.g., to the MAC module included in the control module 108).

One or more ports 102 can be rendered useless when one or more PHY modules 106 fail during manufacturing or during normal operation. For example, the SERDES module 112 in one or more PHY modules 106 can fail during manufacturing or during normal operation, which can render the corresponding port or ports 102 unusable. More specifically, the switch IC 104 must be discarded when any of the PHY modules 106 fails. The switch IC 104 is too huge and expensive to be discarded simply because a single PHY module 106 fails. The present disclosure proposes many solutions for handling such failures.

Figure 2A:
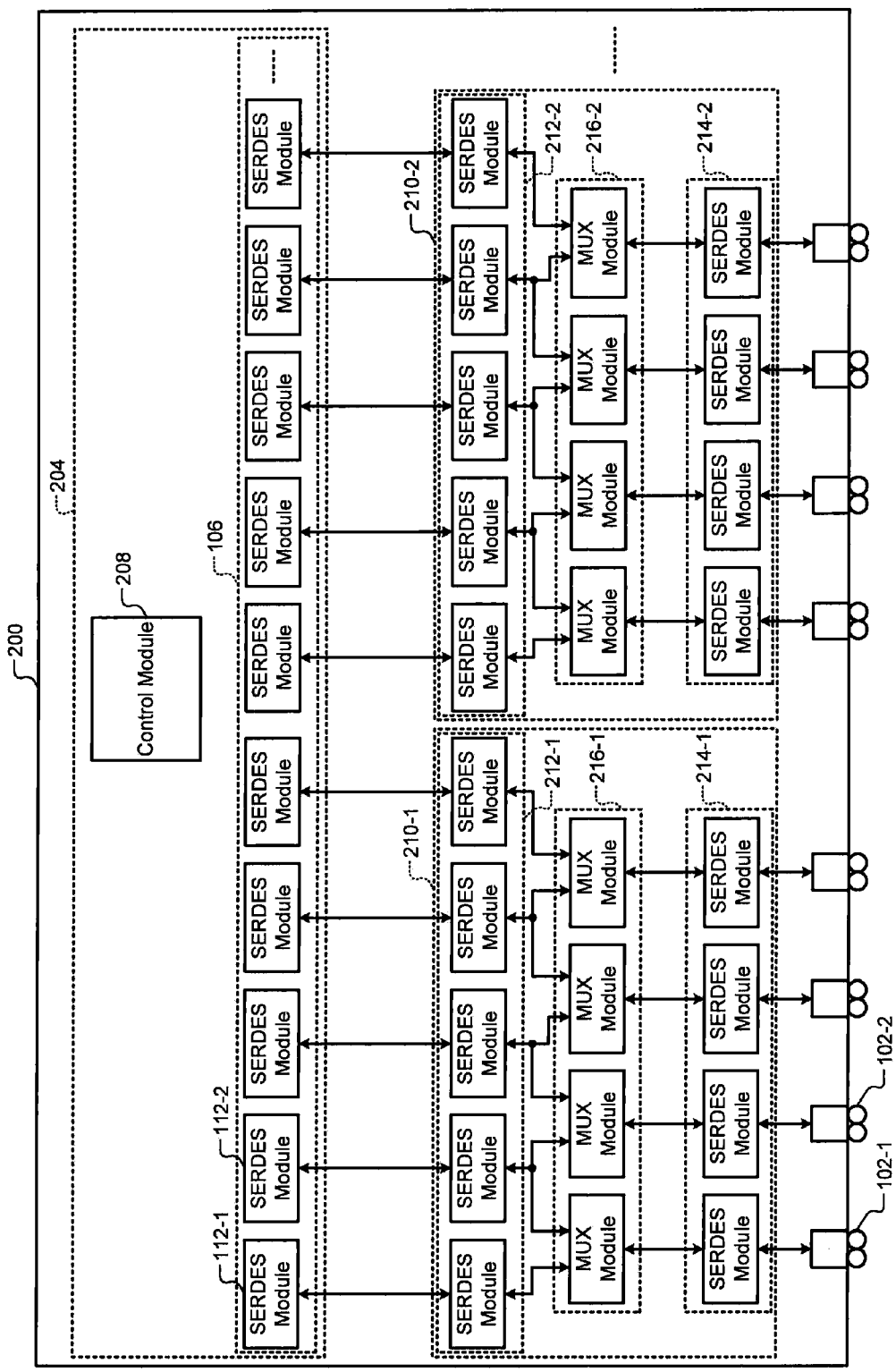
FIG. 2A is a functional block diagram of a network switch including PHY integrated circuits according to the present disclosure.
Figure 2B:
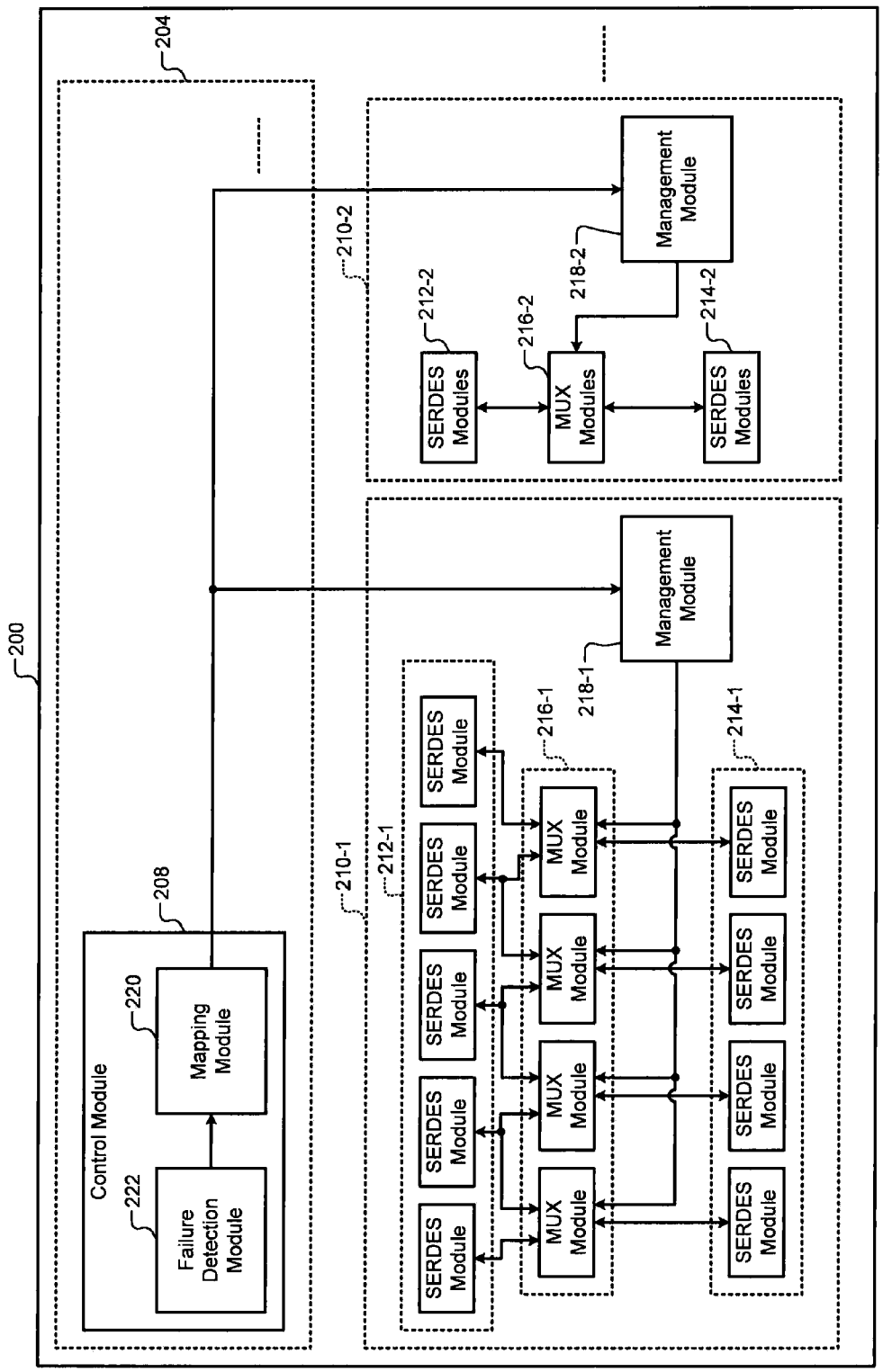
FIG. 2B is a functional block diagram showing details of a control module and the PHY ICs of the network switch of FIG. 2A.

In a first solution shown in FIGS. 2A and 2B, every M PHY modules of the switch IC are configured to communicate with (M−1) ports of the switch, where M is an integer greater than 1. Specifically, for every M SERDES modules in the switch IC, a PHY IC comprising M SERDES modules (and other circuitry described below) is interposed between the M SERDES modules of the switch IC and corresponding (M−1) ports of the switch. The M SERDES modules in the PHY IC communicate with the M SERDES modules of the switch IC and are multiplexed to (M−1) additional SERDES modules in the PHY IC. The (M−1) SERDES modules in the PHY IC communicate with the (M−1) ports of the switch. As explained below in detail, when one of the M SERDES modules in the switch IC fails, the remaining (M−1) SERDES modules in the switch IC communicate with the (M−1) ports via the SERDES modules and multiplexers in the PHY IC.

If P denotes a total number of ports of the switch, and if M is selected such that P/M is an integer greater than 1, the first solution uses P/M number of PHY ICs and provides a M:(M−1) redundancy. For example, if P=100, and if M=5, the first solution uses 20 PHY ICs and provides a 5:4 redundancy. Thus, none of the ports of the switch are rendered useless although one of every M SERDES modules in the switch IC fails.

Figure 3A:
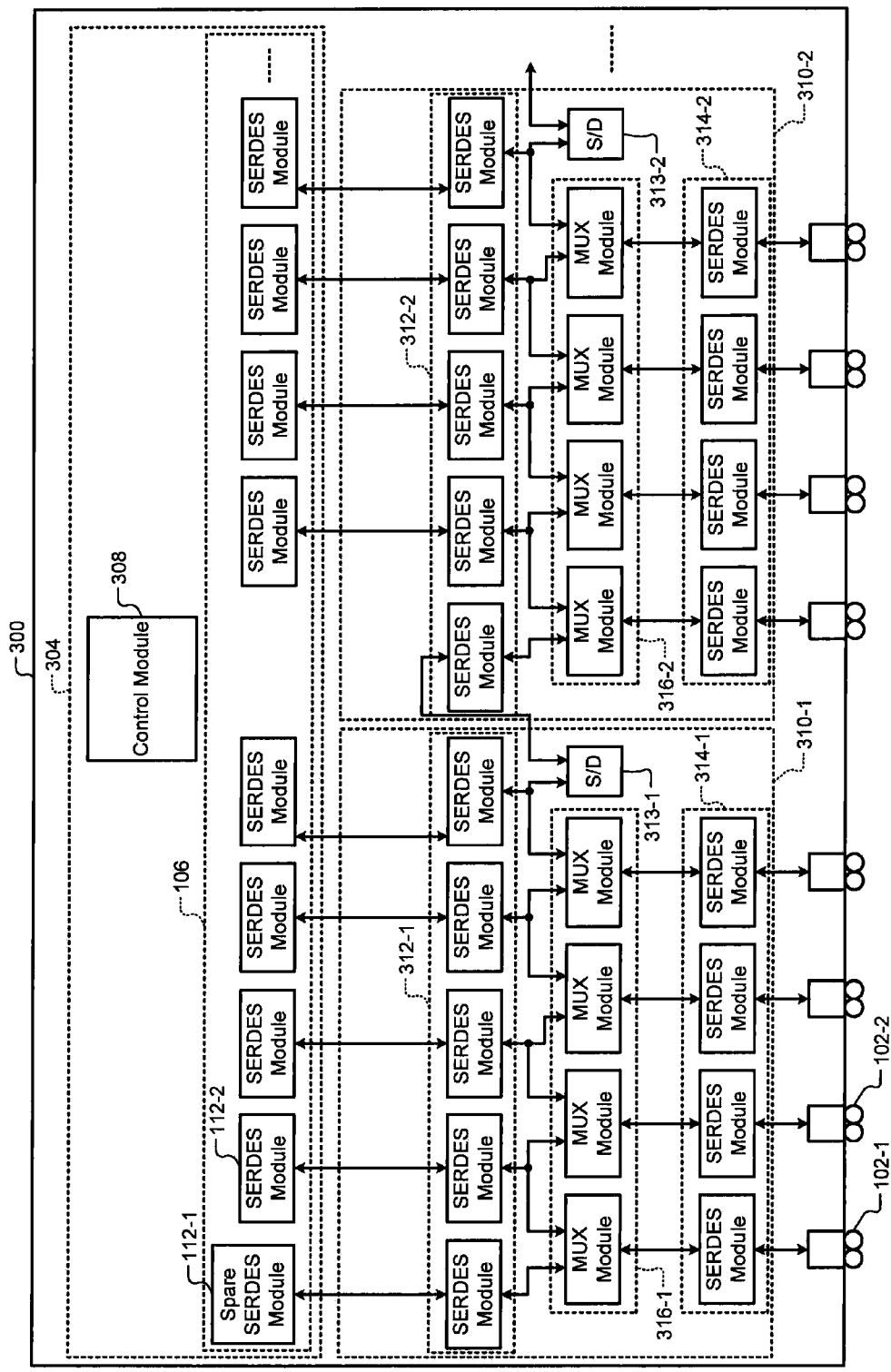
FIG. 3A is a functional block diagram of a network switch including a spare serializer/deserializer (SERDES) module and PHY integrated circuits each having an interconnecting SERDES module according to the present disclosure.
Figure 3B:
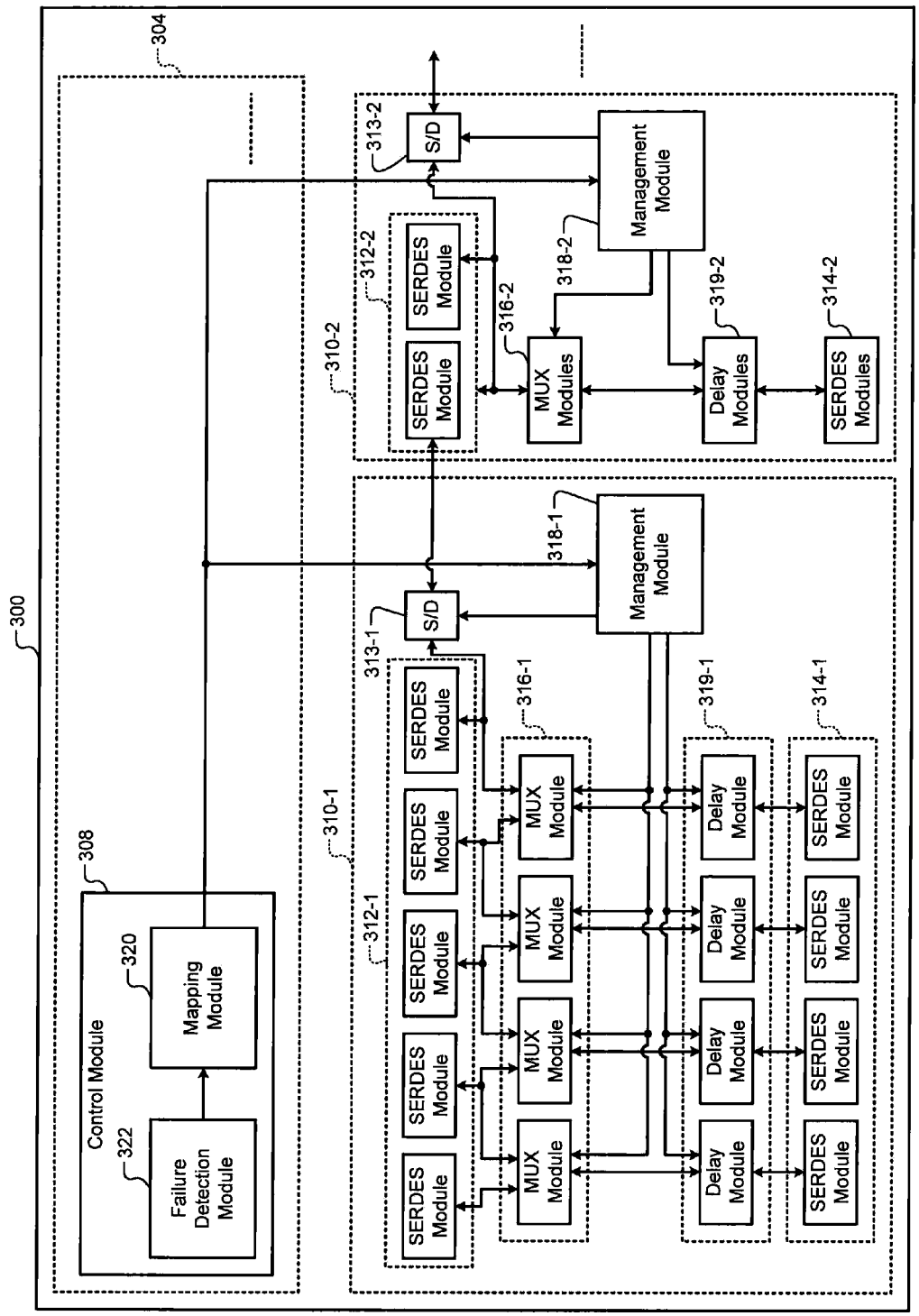
FIG. 3B is a functional block diagram showing details of a control module and the PHY ICs of the network switch of FIG. 3A.

In a second solution shown in FIGS. 3A and 3B, one SERDES module in the switch IC is designated as a spare SERDES module. For a first group of M SERDES modules in the switch IC including the spare SERDES module, a first IC comprising (M+1) SERDES modules (and other circuitry described below) is interposed between the M SERDES modules of the switch IC and (M−1) ports of the switch. For every (M−1) subsequent SERDES modules of the switch IC, second and subsequent ICs each comprising (M+1) SERDES modules (and other circuitry described below) are interposed between the (M−1) SERDES modules of the switch IC and corresponding groups of (M−1) ports. The first IC and the second and subsequent ICs can be daisy chained in a first manner as explained below in detail. When one of the SERDES modules in the switch IC fails, the SERDES modules in the switch IC are remapped to utilize the spare SERDES module. Thus, none of the ports are rendered useless when one of the M SERDES modules in the switch IC fails.

Figure 4A:
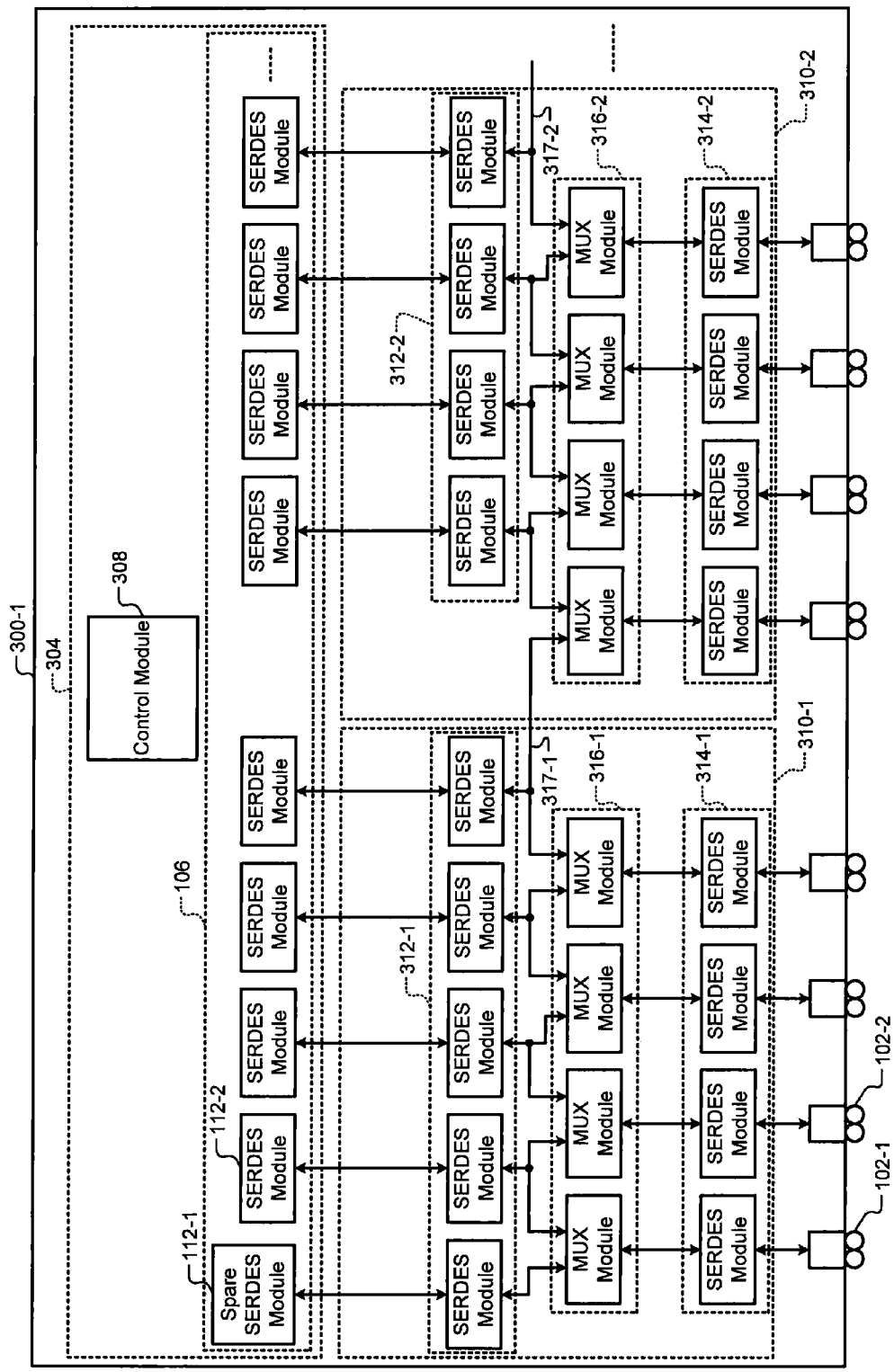
FIG. 4A is a functional block diagram of a network switch including a spare serializer/deserializer (SERDES) module and PHY integrated circuits without an interconnecting SERDES module according to the present disclosure.
Figure 4B:
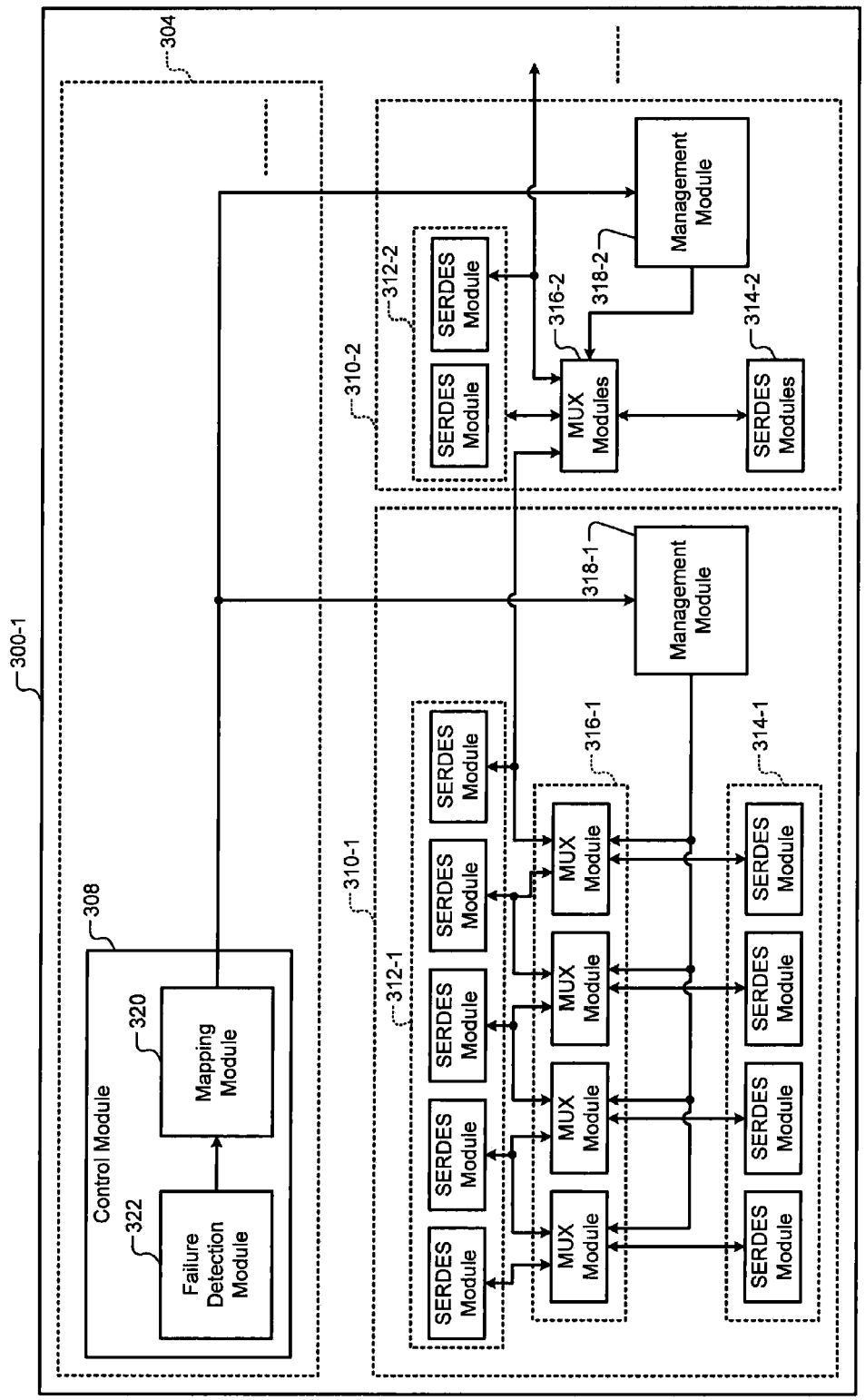
FIG. 4B is a functional block diagram showing details of a control module and the PHY ICs of the network switch of FIG. 4A.

In a third solution shown in FIGS. 4A and 4B, one SERDES module in the switch IC is designated as a spare SERDES module. For a first group of M SERDES modules in the switch IC including the spare SERDES module, a first IC comprising M SERDES modules (and other circuitry described below) is interposed between the M SERDES modules of the switch IC and (M−1) ports of the switch. For every (M−1) subsequent SERDES modules of the switch IC, second and subsequent ICs each comprising (M−1) SERDES modules (and other circuitry described below) are interposed between the (M−1) SERDES modules of the switch IC and corresponding groups of (M−1) ports. The first IC and the second and subsequent ICs can be daisy chained in a second manner as explained below in detail. When one of the SERDES modules in the switch IC fails, the SERDES modules in the switch IC are remapped to utilize the spare SERDES module. Thus, none of the ports are rendered useless when one of the M SERDES modules in the switch IC fails.

Figure 5A:
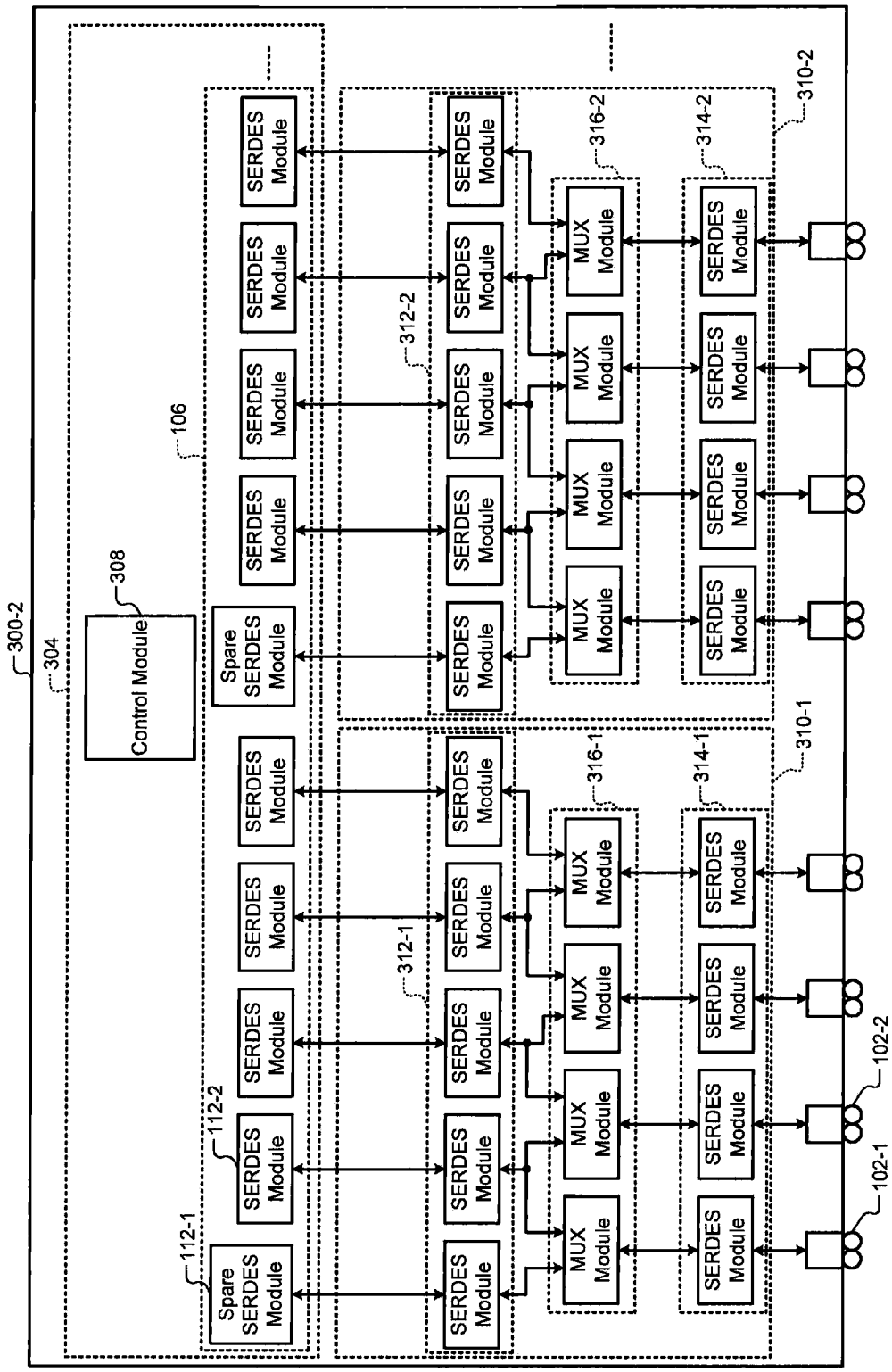
FIG. 5A is a functional block diagram of a network switch including spare serializer/deserializer (SERDES) modules and PHY integrated circuits according to the present disclosure.
Figure 5B:
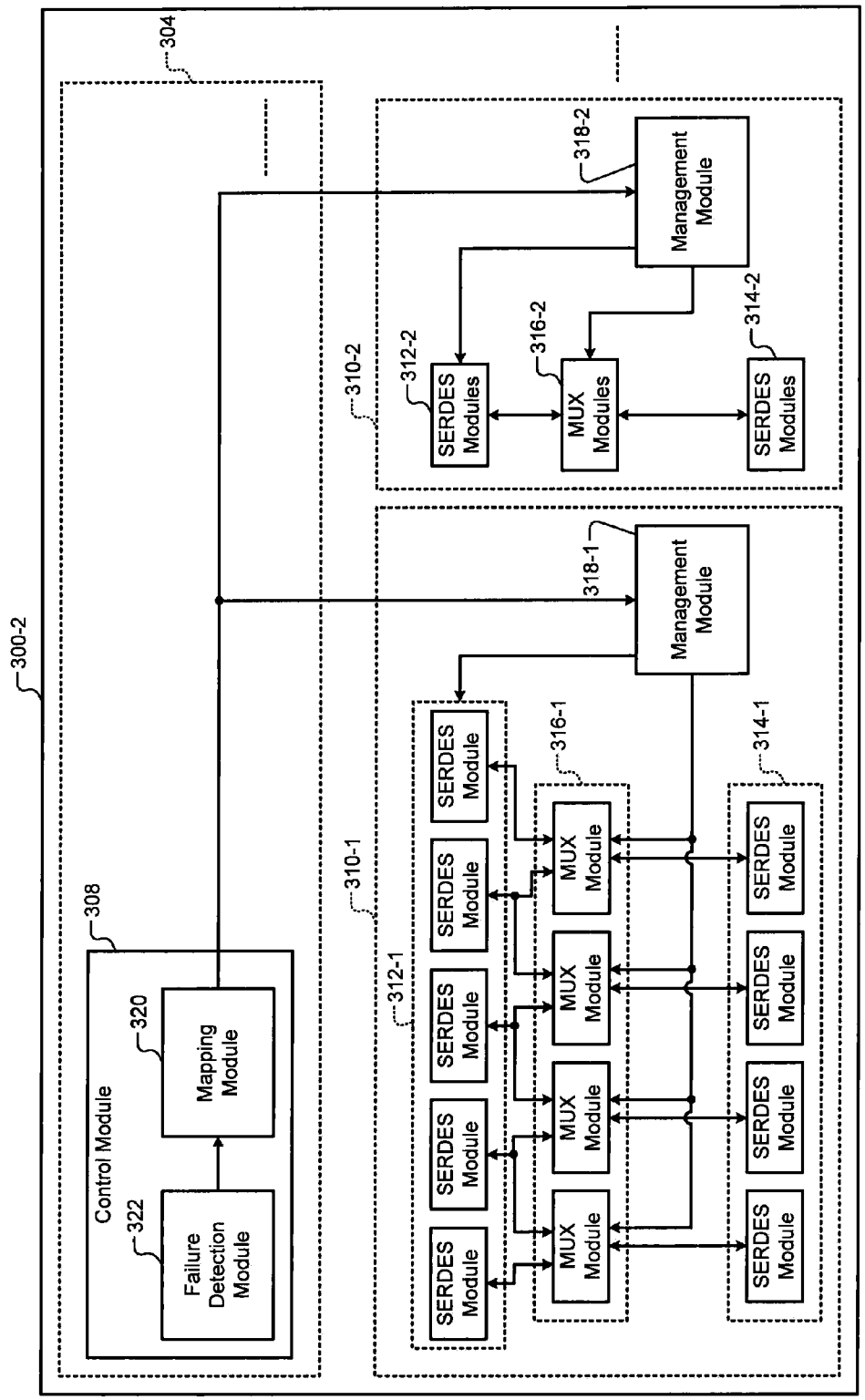
FIG. 5B is a functional block diagram showing details of a control module and the PHY ICs of the network switch of FIG. 5A.

In a fourth solution shown in FIGS. 5A and 5B, the SERDES modules in the switch IC are divided into groups of M SERDES modules. Each group of M SERDES modules includes a spare SERDES module. A first IC comprising M SERDES modules (and other circuitry described below) is interposed between the M SERDES modules of the switch IC and (M−1) ports of the switch. For every subsequent group of M SERDES modules of the switch IC, which includes a spare SERDES module, second and subsequent ICs each comprising M SERDES modules (and other circuitry described below) are interposed between the groups of M SERDES modules of the switch IC and corresponding groups of (M−1) ports. When one of the SERDES modules in a group of M SERDES modules of the switch IC fails, the SERDES modules in the group are remapped to utilize the spare SERDES module in the group. Thus, none of the ports corresponding to the group is rendered useless when one of the M SERDES modules in the group fails.

Figure 6:
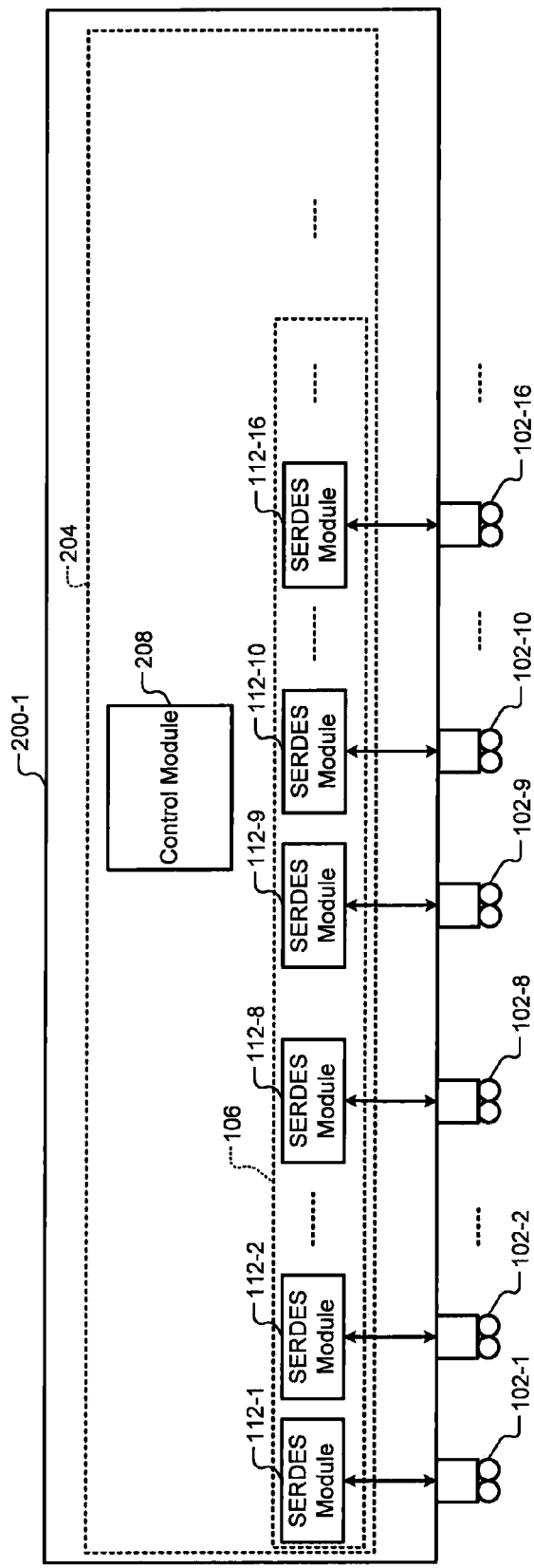
FIG. 6 is a functional block diagram of a network switch including PHY integrated circuits according to the present disclosure.

In a fifth solution shown in FIG. 6, the SERDES modules in the switch IC are divided into groups of M SERDES modules. The ports of the switch IC are also divided into groups of M ports. M can be $2^x$, where x is an integer generally greater than or equal to 3. In other words, M can be 8, 16, 32, and so on. Each SERDES module in the switch IC communicates with a respective one of the ports. When none of the SERDES modules in the switch fails, the ports in each group transfer data at a predetermined rate (e.g., R, where R may be an integer greater than 1). When a SERDES module in a group fails, the port corresponding to the failed SERDES module also fails. The remaining SERDES modules in the group and the corresponding ports in the group transfer data at a higher rate than R as explained below in detail. Thus, while one SERDES module in the group (and the corresponding port in the group) is rendered useless, data is transferred at the rate R.

Referring now to FIGS. 2A and 2B, a switch 200 according to the present disclosure is shown. In FIG. 2A, the switch 200 includes the ports 102 and a switch IC 204. The switch IC 204 includes circuitry for supporting the ports 102 and circuitry for controlling the operation of the switch 200. Specifically, the switch IC 204 includes the PHY modules 106 that communicate with the ports 102. For simplicity of illustration, only SERDES modules 112-1, 112-2, . . . , and 112-P (collectively SERDES modules 112) of the PHY modules 106 are shown.

The switch IC 204 includes a control module 208 that controls the operation of the switch 200. The control module 208 communicates with the PHY modules 106 although connections between the control module 208 and the PHY modules 106 are omitted for simplicity of illustration. The control module 208 may include one or more MAC modules (not shown) that communicate with the PHY modules 106.

The switch 200 further includes a plurality of PHY ICs 210-1, 210-2, . . . , etc. (collectively PHY ICs 210). A first PHY IC 210-1 includes a first set of M SERDES modules 212-1 that communicate with a first set of M SERDES modules 112 of the switch IC 204, respectively, where M is an integer greater than 1. For example only, M=5 as shown in FIG. 2A. The first PHY IC 210-1 additionally includes a first set of N SERDES modules 214-1 that communicate with a first set of N ports 102 of the switch 200, respectively, where N=(M−1). For example only, N=4 as shown in FIG. 2A.

The first PHY IC 210-1 further includes a first set of N multiplexer modules 216-1 that communicate with the N SERDES modules in the first set of N SERDES modules 214-1, respectively. Additionally, the N multiplexer modules communicate with the M SERDES modules in the first set of M SERDES modules 212-1 as shown. Specifically, each of the N multiplexer modules communicates with a pair of adjacent SERDES modules in the first set of M SERDES modules 212-1 as shown.

The second PHY IC 210-2 includes a second set of M SERDES modules 212-2 that communicate with a second set of M SERDES modules 112 of the switch IC 204, respectively. The second PHY IC 210-2 additionally includes a second set of N SERDES modules 214-2 that communicate with a second set of N ports 102 of the switch 200, respectively.

The second PHY IC 210-2 further includes a second set of N multiplexer modules 216-2 that communicate with the N SERDES modules in the second set of N SERDES modules 214-2, respectively. Additionally, the N multiplexer modules in the second set of N multiplexer modules 216-2 communicate with the M SERDES modules in the second set of M SERDES modules 212-2 as shown. Specifically, each of the N multiplexer modules in the second set of N multiplexer modules 216-2 communicates with a pair of adjacent SERDES modules in the second set of M SERDES modules 212-2 as shown.

The multiplexer modules in the present disclosure are bidirectional. That is, the multiplexer modules communicate data from the SERDES modules 112 of the switch IC to the ports 102 and from the ports 102 to the SERDES modules 112 of the switch IC. Accordingly, while data-flows from the SERDES modules 112 of the switch ICs to the ports 102 are used to describe the teachings of the present disclosure, the teachings apply equally to data-flows from the ports 102 to the SERDES modules 112 of the switch ICs.

In FIG. 2B, the first PHY IC 210-1 further includes a first management module 218-1 that receives first data from the switch IC 204 to control the N multiplexer modules in the first set of N multiplexer modules 216-1. Based on the first data, each of the N multiplexer modules in the first set of N multiplexer modules 216-1 routes data between a corresponding one of the N SERDES modules in the first set of N SERDES modules 214-1 and one SERDES module from the corresponding pair of SERDES modules in the first set of M SERDES modules 212-1. Effectively, based on the first data, each of the N multiplexer modules in the first set of N multiplexer modules 216-1 routes data between a corresponding port in the first set of N ports 102 of the switch 200 and one SERDES module in the first set of M SERDES modules 112 of the switch IC 204.

The second PHY IC 210-2 further includes a second management module 218-2 that receives second data from the switch IC 204 to control the N multiplexer modules in the second set of N multiplexer modules 216-2. Based on the second data, each of the N multiplexer modules in the second set of N multiplexer modules 216-2 routes data between a corresponding one of the N SERDES modules in the second set of N SERDES modules 214-2 and one SERDES module from the corresponding pair of SERDES modules in the second set of M SERDES modules 212-2. Effectively, based on the second data, each of the N multiplexer modules in the second set of N multiplexer modules 216-2 routes data between a corresponding port in the second set of N ports 102 of the switch 200 and one SERDES module in the second set of M SERDES modules 112 of the switch IC 204.

More specifically, the control module 208 includes a mapping module 220 and a failure detection module 222. The mapping module 220 maps the first set of M SERDES modules 112 of the switch IC 204 to the first set of N ports 102 of the switch 200 according to a first mapping. The mapping module 220 maps the second set of M SERDES modules 112 of the switch IC 204 to the second set of N ports 102 of the switch 200 according to a second mapping, and so on. The mapping module 220 sends the first data corresponding to the first mapping to the first management module 218-1, sends the second data corresponding to the second mapping to the second management module 218-2, and so on.

The failure detection module 222 detects when one SERDES module fails in the first set of M SERDES modules 112 of the switch IC 204 or in the second set of M SERDES modules 112 of the switch IC 204, and so on. For example, when one SERDES module fails in the first set of M SERDES modules 112 of the switch IC 204, the mapping module 220 remaps the normally functioning SERDES modules from the first set of M SERDES modules 112 of the switch IC 204 to the first set of N ports 102 of the switch 200 according to a third mapping. The mapping module 220 sends the first data corresponding to the third mapping to the first management module 218-1. When one SERDES module fails in the second set of M SERDES modules 112 of the switch IC 204, the mapping module 220 remaps the normally functioning SERDES modules from the second set of M SERDES modules 112 of the switch IC 204 to the second set of N ports 102 of the switch 200 according to a fourth mapping. The mapping module 220 sends the second data corresponding to the fourth mapping to the second management module 218-2, and so on.

Thus, the PHY ICs 210 route data between the normally functioning SERDES modules 112 of the switch IC 204 and the ports 102 of the switch 200 when one SERDES module fails in one or more of every M SERDES modules 112 of the switch IC 204. Accordingly, all the ports 102 of the switch 200 function normally although one SERDES module fails in one or more of every M SERDES modules 112 of the switch IC 204.

Referring now to FIGS. 3A and 3B, a switch 300 according to the present disclosure is shown. In FIG. 3A, the switch 300 includes the ports 102 and a switch IC 304. The switch IC 304 includes circuitry for supporting the ports 102 and circuitry for controlling the operation of the switch 300. Specifically, the switch IC 304 includes the PHY modules 106 that communicate with the ports 102, respectively. For simplicity of illustration, only the SERDES modules 112 of the PHY modules 106 are shown.

The switch IC 304 includes a spare SERDES module. For example, a first one of the SERDES modules 112 in the first one of the PHY modules 106 can be designated as a spare SERDES module. In some implementations, a SERDES module in addition to the SERDES modules 112 may be provided as a spare SERDES module.

The switch IC 304 further includes a control module 308 that controls the operation of the switch 300. The control module 308 communicates with the PHY modules 106 although connections between the control module 308 and the PHY modules 106 are omitted for simplicity of illustration. The control module 308 may include one or more MAC modules (not shown) that communicate the PHY modules 106.

The switch 300 further includes a plurality of PHY ICs 310-1, 310-2, . . . , etc. (collectively PHY ICs 310). A first PHY IC 310-1 includes a first set of M SERDES modules 312-1 that communicate with a first set of M SERDES modules 112 of the switch IC 204, respectively, where M is an integer greater than 1. For example only, M=5 as shown in FIG. 3A. The first set of M SERDES modules 112 of the switch IC 204 includes the spare SERDES module of the switch IC 304. The first PITY IC 310-1 additionally includes a first set of N SERDES modules 314-1 that communicate with a first set of N ports 102 of the switch 300, respectively, where N=(M−1). For example only, N=4 as shown in FIG. 3A.

The first PHY IC 310-1 further includes a first set of N multiplexer modules 316-1 that communicate with the N SERDES modules in the first set of N SERDES modules 314-1, respectively. Additionally, the N multiplexer modules in the first set of N multiplexer modules 316-1 communicate with the M SERDES modules in the first set of M SERDES modules 312-1 as shown. Specifically, each of the N multiplexer modules in the first set of N multiplexer modules 316-1 communicates with a pair of adjacent SERDES modules in the first set of M SERDES modules 312-1 as shown.

The second PHY IC 310-2 includes a second set of M SERDES modules 312-2, where (M−1) of the second set of M SERDES modules 312-2 communicate with a second set of (M−1) SERDES modules 112 of the switch IC 304, respectively. The second PHY IC 310-2 additionally includes a second set of N SERDES modules 314-2 that communicate with a second set of N ports 102 of the switch 300, respectively.

The second PHY IC 310-2 further includes a second set of N multiplexer modules 316-2 that communicate with the N SERDES modules in the second set of N SERDES modules 314-2, respectively. Additionally, the N multiplexer modules in the second set of N multiplexer modules 316-2 communicate with the M SERDES modules in the second set of M SERDES modules 312-2 as shown. Specifically, each of the N multiplexer modules in the second set of N multiplexer modules 316-2 communicates with a pair of adjacent SERDES modules in the second set of M SERDES modules 312-2 as shown.

The first PHY IC 310-1 further includes an $(M+1)^{th}$ SERDES module (shown as S/D) 313-1. The $(M+1)^{th}$ SERDES module 313-1 communicates with an $M^{th}$ SERDES module in the first set of M SERDES modules 312-1 and an $N^{th}$ multiplexer module in the first set of N multiplexer modules 316-1 as shown. The $(M+1)^{th}$ SERDES module 313-1 also communicates with a first SERDES module in the second set of M SERDES modules 312-2 of the second PHY IC 310-2 as shown.

Thus, the $(M+1)^{th}$ SERDES module 313-1 of the first PHY IC 310-1 interconnects the first PHY IC 310-1 to the second PHY IC 310-2. Accordingly, the $(M+1)^{th}$ SERDES module 313-1 of the first PHY IC 310-1 is called an interconnecting SERDES module.

The first SERDES module in the second set of M SERDES modules 312-2 of the second PHY IC 310-2, which is different than the (M−1) SERDES modules in the second set of M SERDES modules 312-2, communicates with a first multiplexer module in the first set of N multiplexer modules 316-2 of the second PHY IC 310-2. The first SERDES module in the second set of M SERDES modules 312-2 does not communicate with the second set of (M−1) SERDES modules 112 of the switch IC 304.

The second PHY IC 310-2 also includes an $(M+1)^{th}$ SERDES module (shown as S/D) 313-2. The $(M+1)^{th}$ SERDES module 313-2 of the second PHY IC 310-2 communicates with an $M^{th}$ SERDES module in the second set of M SERDES modules 312-2 and an $N^{th}$ multiplexer module in the second set of N multiplexer modules 316-2 as shown. The $(M+1)^{th}$ SERDES module 313-2 of the second PHY IC 310-2 also communicates with a first SERDES module in a third set of M SERDES modules 312-3 of a third PHY IC 310-3 (not shown), and so on. Thus, the $(M+1)^{th}$ SERDES module 313-2 of the second PHY IC 310-2 interconnects the second PHY IC 310-2 to the third PHY IC 310-3 and is accordingly also called an interconnecting SERDES module.

In FIG. 3B, the first PHY IC 310-1 further includes a first management module 318-1 that receives first data from the switch IC 304 to control the N multiplexer modules in the first set of N multiplexer modules 316-1. Based on the first data, each of the N multiplexer modules in the first set of N multiplexer modules 316-1 routes data between a corresponding one of the N SERDES modules in the first set of N SERDES modules 314-1 and one SERDES module from the corresponding pair of SERDES modules in the first set of M SERDES modules 312-1. Effectively, based on the first data, each of the N multiplexer modules in the first set of N multiplexer modules 316-1 routes data between a corresponding port in the first set of N ports 102 of the switch 300 and one SERDES module in the first set of M SERDES modules 112 of the switch IC 304.

The second PHY IC 310-2 further includes a second management module 318-2 that receives second data from the switch IC 304 to control the N multiplexer modules in the second set of N multiplexer modules 316-2. Based on the second data, each of the N multiplexer modules in the second set of N multiplexer modules 316-2 routes data between a corresponding one of the N SERDES modules in the second set of N SERDES modules 314-2 and one SERDES module from the corresponding pair of SERDES modules in the second set of M SERDES modules 312-2. Effectively, based on the second data, each of the N multiplexer modules in the second set of N multiplexer modules 316-2 routes data between a corresponding port in the second set of N ports 102 of the switch 300 and one SERDES module in the second set of (M−1) SERDES modules 112 of the switch IC 304.

More specifically, the control module 308 includes a mapping module 320 and a failure detection module 322. The mapping module 320 maps the first set of M SERDES modules 112 of the switch IC 304 to the first set of N ports 102 of the switch 300 according to a first mapping. The mapping module 320 maps the second set of (M−1) SERDES modules 112 of the switch IC 304 to the second set of N ports 102 of the switch 300 according to a second mapping, and so on. The mapping module 320 sends the first data corresponding to the first mapping to the first management module 318-1, sends the second data corresponding to the second mapping to the second management module 318-2, and so on. The management modules 318-1, 318-2, and so on are hereinafter collectively referred to as management modules 318.

The failure detection module 322 detects when one SERDES module (other than the spare SERDES module) fails in the first set of M SERDES modules 112 of the switch IC 304 or in the second set of (M−1) SERDES modules 112 of the switch IC 304, and so on. For example, one SERDES module (other than the spare SERDES module) may fail in the first set of M SERDES modules 112 of the switch IC 204. In response, the mapping module 320 remaps the normally functioning SERDES modules from the first set of M SERDES modules 112 of the switch IC 304, including the spare SERDES module, to the first set of N ports 102 of the switch 300 according to a third mapping. The mapping module 320 sends the first data corresponding to the third mapping to the first management module 318-1.

When one SERDES module fails in the second set of (M−1) SERDES modules 112 of the switch IC 304, the mapping module 320 remaps as follows. The mapping module 320 remaps the SERDES modules from the first set of M SERDES modules 112 of the switch IC 304, including the spare SERDES module, to the first set of N ports 102 of the switch 300 according to a third mapping. Additionally, the mapping module 320 remaps the normally functioning SERDES modules from the second set of (M−1) SERDES modules 112 of the switch IC 304 to the second set of N ports 102 of the switch 300 according to a fourth mapping. The mapping module 320 sends the first data corresponding to the third mapping to the first management module 318-1. The mapping module 320 sends the second data corresponding to the fourth mapping to the second management module 318-2 and so on.

For example, suppose the $1^{st}$ SERDES module in the SERDES modules 112 of the switch IC 304 is the spare SERDES module. If a $K^{th}$ SERDES module 112 of the switch IC 304 fails, where K>1, ports 102 of the switch 304 originally mapped from $2^{nd}$ through $K^{th}$ SERDES modules 112 are remapped to $1^{st}$ through $(K-1)^{th}$ SERDES modules 112. If the $K^{th}$ SERDES module 112 is among the SERDES modules 112 communicating with the second or subsequent PITY ICs 310, the management modules 318 of the corresponding PHY ICs 310 activate SERDES modules that interconnect the PHY ICs 310. The SERDES modules of the PHY ICs 310 that interconnect the PHY ICs 310 may be normally deactivated when interconnections between the PHY ICs 310 are unnecessary. The management modules 318 of the PHY ICs 310 may activate/deactivate the interconnecting SERDES modules of the PHY ICs 310 based on the first data, second data, etc. received from the mapping module 320. Additionally, the control module 308 may activate/deactivate the spare SERDES module based on the first data, second data, etc. received from the mapping module 320. As used herein, activation of a module includes turning on power supply and/or clock of the module while deactivation of a module includes turning off power supply and/or clock of the module.

Thus, the PHY ICs 310 route data between the functioning SERDES modules 112 of the switch IC 304 and the ports 102 of the switch 300 when one SERDES module fails in one or more of every (M−1) SERDES modules 112 of the switch IC 304.

Accordingly, all the ports 102 of the switch 300 function normally although one SERDES module fails in one or more of every M SERDES modules 112 of the switch IC 304.

A delay may be occur when data are forwarded from the $(M+1)^{th}$ SERDES module 313-1 of the first PHY IC 310-1 (shown as S/D) to the first SERDES module in the second set of M SERDES modules 312-2 of the second PHY IC 310-2, and so on. The first PHY IC 310-1 further includes N delay modules (shown collectively as delay modules 319-1). The second PHY IC 310-2 further includes N delay modules (shown collectively as delay modules 319-2), and so on. The delay modules 319-1, 319-2, and so on are hereinafter collectively referred to as delay modules 319.

If a $K^{th}$ SERDES module 112 in the switch IC 304 fails, the management modules 318 of the PHY ICs 310 communicating with $1^{st}$ through $K^{th}$ SERDES modules 112 activate the delay modules 319 of the corresponding PHY ICs 310. The delay modules 319 add a delay to data streams flowing between the SERDES modules 312 of the switch IC 304 and the ports 102 of the switch 300. The delay corresponds to the delay incurred in forwarding data via the interconnecting SERDES modules of the corresponding PHY ICs 310. In some implementations, the management modules 318 of all the PHY ICs 310 may activate the delay modules 319 although all of the SERDES modules 112 of the switch IC 304 function normally. While not shown, third and subsequent PHY ICs 310, are similar to the second PHY IC 310-2.

In summary, FIGS. 2A and 2B depict single-chip redundancy, where for P sets of N ports, P*(N+1) SERDES modules map to P*N SERDES modules in P PHY ICs. The switch IC 204 includes P*(N+1) SERDES modules 112's, and the switch 200 includes P PHY ICs 210 with a total of P*N ports 102. The redundancy is N+1 to N. FIGS. 3A and 3B depict multi-chip redundancy, where for P sets of N ports, P*(K*N+1) SERDES modules map to P*K*N SERDES modules in P PHY ICs. The switch IC 304 includes P*(K*N+1) SERDES modules 112, and the switch 300 includes P*K PHY ICs 310 with a total of P*K*N ports 102. The redundancy is K*N+1 to K*N. When K=1, the redundancy becomes N+1 to N. In FIGS. 3A and 3B, K PHY ICs are daisy chained to form a group. K=number of PHY Ics 310 that form a group. P=number of K groups. N=number of ports 102 per PHY IC. When K=1, only N+1 SERDES modules are needed in elements 212 shown in FIGS. 2A and 2B. When K>1, N+2 SERDES modules are needed in elements 312 shown in FIGS. 3A and 3B. The additional SERDES module is needed to daisy chain. P, N, and K are integers greater than 1.

Referring now to FIGS. 4A and 4B, a switch 300-1 according to the present disclosure is shown. The switch 300-1 operates in the same manner as the switch 300 shown in FIGS. 3A and 3B except for the following. In FIG. 4A, the switch 300-1 does not include the interconnecting SERDES modules that interconnect the PHY ICs 310. Additionally, the switch 300-1 does not include the delay modules 319 shown in FIGS. 3A and 3B. Accordingly, the second set of SERDES modules 312-2 of the second PHY IC 310-2 (and subsequent PHY ICs 310) includes only (M−1=N) SERDES modules. The $M^{th}$ SERDES module in the first set of M SERDES modules 312-1 communicates via a link 317-1 with an $N^{th}$ multiplexer module in the first set of N multiplexer modules 316-1 and with a $1^{st}$ multiplexer module in the second set of N multiplexer modules 316-2 as shown. Similarly, an $N^{th}$ SERDES module in the second set of N SERDES modules 312-2 communicates via a link 317-2 with an $N^{th}$ multiplexer module in the second set of N multiplexer modules 316-2 and with a $1^{st}$ multiplexer module in a third set of N multiplexer modules 316-3 of a third PHY IC 310-3 (not shown), and so on.

In FIG. 4B, if a $K^{th}$ SERDES module 112 of the switch IC 304 fails, where K>1, ports 102 of the switch 304 originally mapped from $2^{nd}$ through $K^{th}$ SERDES modules 112 are remapped to $1^{st}$ through $(K-1)^{th}$ SERDES modules 112. The management modules 318 of the PHY ICs 310 control the multiplexer modules of the PHY ICs 310 based on the first data, second data, etc. received from the mapping module 320. The PHY ICs 310 route data between the functioning SERDES modules 112 of the switch IC 304 and the ports 102 of the switch 300 when one SERDES module fails in one or more of every (M−1) SERDES modules 112 of the switch IC 304. Accordingly, all the ports 102 of the switch 300 function normally although one SERDES module fails in one or more of every M SERDES modules 112 of the switch IC 304.

Referring now to FIGS. 5A and 5B, a switch 300-2 according to the present disclosure is shown. The switch 300-2 operates in the same manner as the switch 300 shown in FIGS.

3A and 3B except for the following. In FIG. 5A, the switch 300-2 does not include the interconnecting SERDES modules that interconnect the PHY ICs 310. Additionally, the switch 300-2 does not include the delay modules 319 shown in FIGS. 3A and 3B. Instead, the switch 300-2 includes a spare SERDES module for each set of N SERDES modules 112 of the switch IC 304 as shown. Each PHY IC 310 includes (N+1) SERDES modules that communicate with a set of N SERDES modules 112 and a spare SERDES module in the set as shown (e.g., N=4). Accordingly, the first set of SERDES modules 312-1, the second set of SERDES modules 312-2, etc. each has (N+1) SERDES modules.

In FIG. 5B, the mapping module 320 maps the first set of N SERDES modules 112 of the switch IC 304 to the first set of N ports 102 of the switch 300-2 according to a first mapping. The mapping module 320 maps the second set of N SERDES modules 112 of the switch IC 304 to the second set of N ports 102 of the switch 300-2 according to a second mapping, and so on. The mapping module 320 sends the first data corresponding to the first mapping to the first management module 318-1, sends the second data corresponding to the second mapping to the second management module 318-2, and so on.

The failure detection module 322 detects when one SERDES module (other than the spare SERDES module) fails in any set of N SERDES modules 112 of the switch IC 304. For example, one SERDES module (other than the spare SERDES module) may fail in the first set of M SERDES modules 112 of the switch IC 204. In response, the mapping module 320 remaps the normally functioning SERDES modules from the first set of N SERDES modules 112 of the switch IC 304, including the corresponding spare SERDES module, to the first set of N ports 102 of the switch 300-2 according to a third mapping. The mapping module 320 sends the first data corresponding to the third mapping to the first management module 318-1.

When one SERDES module fails in the second set of N SERDES modules 112 of the switch IC 304, the mapping module 320 remaps the normally functioning SERDES modules from the second set of N SERDES modules 112 of the switch IC 304, including the corresponding spare SERDES module, to the second set of N ports 102 of the switch 300-2 according to a third mapping. The mapping module 320 sends the first data corresponding to the third mapping to the first management module 318-1, and so on.

The management module 318-1 may deactivate an $(N+1)^{th}$ SERDES module in the first set of SERDES modules 312-1, which communicates with the corresponding spare SERDES module, when no SERDES module in the corresponding set of N SERDES modules 112 has failed. The management module 318-2 may deactivate an $(N+1)^{th}$ SERDES module in the second set of SERDES modules 312-2, which communicates with the corresponding spare SERDES module, when no SERDES module in the corresponding set of N SERDES modules 112 has failed, and so on. Additionally, the control module 308 may activate/deactivate the spare SERDES modules based on the first data, second data, etc. received from the mapping module 320.

Referring now to FIG. 6, a switch 200-1 according to the present disclosure is shown. The switch 200-1 differs from the switch 200 in that the switch 200-1 does not include PHY ICs 210 shown in FIGS. 2A and 2B. Instead, the SERDES modules 112 communicate directly with the ports 102 as shown. The SERDES modules 112 and the ports 102 are divided into groups. Each group includes M SERDES modules and M ports. M can be $2^x$, where x is an integer generally greater than or equal to 3. In other words, M can be 8, 16, 32, and so on.

When none of the SERDES modules in a group fails, the ports in the group transfer data at a predetermined rate (e.g., R, where R may be an integer greater than 1). When a SERDES module in a group fails, the port corresponding to the failed SERDES module also fails. The remaining SERDES modules in the group and the corresponding ports in the group transfer data at a higher rate than R. Thus, while one SERDES module in the group (and the corresponding port in the group) is rendered useless, data is transferred at the rate R.

For example, suppose M=8, and each group includes 8 SERDES modules 112 and corresponding 8 ports 102. When one SERDES module in a group fails, the control module 208 increases the data rate of the remaining ports in the group to 8R/7. In general, the data rate R is multiplied by a total number of ports in a group and is divided by a total number of normally functioning ports in the group. Since 7 of the 8 ports in the group transfer data at the increased data rate of 8R/7, the total throughput of the 7 ports is the same as when the 8 ports were transferring data at the rate R.

An amount by which the data rate has to be increased when a port fails decreases as the number of ports in a group increases. For example, the amount by which the data rate has to be increased when one of 16 ports in a group fails is less than the amount by which the data rate has to be increased when one of 8 ports in a group fails. Similarly, the amount by which the data rate has to be increased when one of 32 ports in a group fails is less than the amount by which the data rate has to be increased when one of 16 ports in a group fails, and so on.

Alternatively, each group may include different number of SERDES modules and ports. For example, a first group may include M SERDES modules and M ports, a second group may include N SERDES modules and N ports, and so on, where M and N are different. For example only, M may be 8, N may be 16, and so on. Additionally, the data rate may be different for each group. For example, the data rate for a first group may be R1, the data rate for a second group may be R2, and so on.

Further, the data rate can also be increased when more than one port in a group fails. Data rate can be increased in this manner, however, when the value of M is large. For example, suppose M=64, and each group includes 64 SERDES modules 112 and corresponding 64 ports 102. When two SERDES module in a group fails, the control module 208 increases the data rate of the remaining ports in the group to 64R/62.

Figure 7:
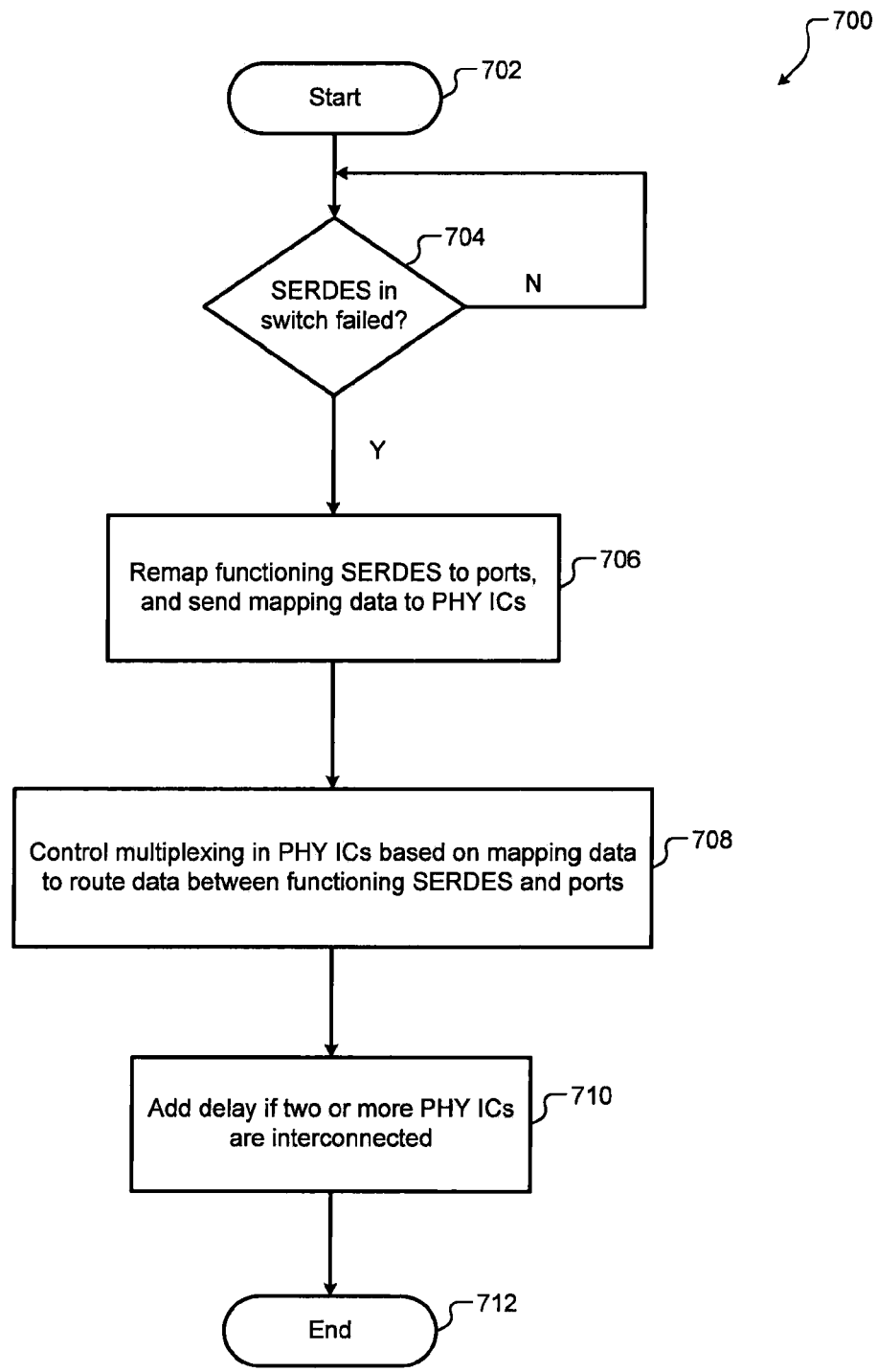
FIG. 7 is a flowchart of a method for controlling a network switch according to the present disclosure.

Referring now to FIG. 7, a method 700 for operating switches according to the present disclosure is shown. Control begins at 702. At 704, control determines if a SERDES module in the switch has failed. Control waits if none of the SERDES modules in the switch has failed. At 706, if a SERDES module in the switch has failed, control remaps (i.e., reassigns) normally functioning SERDES modules to the ports of the switch and sends mapping data to PHY ICs. At 708, control controls multiplexers in the PHY ICs based on the mapping data and routes data between the normally functioning SERDES modules of the switch and the ports of the switch. At 710, if two or more of the PHY ICs are interconnected, control adds a delay to data streams flowing between the normally functioning SERDES modules of the switch and the ports of the switch. Control ends at 712.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
a first integrated circuit (IC) including
   a first set of (N+1) serializer/deserializer (SERDES) modules configured to communicate with a first set of (N+1) SERDES modules of a switch IC of a switch, respectively, where N is an integer greater than 1;
   a first set of N SERDES modules configured to communicate with a first set of N ports of the switch, respectively; and
   a first set of N multiplexer modules configured to communicate with (i) the N SERDES modules in the first set of N SERDES modules, respectively, and (ii) the (N+1) SERDES modules in the first set of (N+1) SERDES modules of the first IC, wherein each of the N multiplexer modules is configured to communicate with a pair of SERDES modules in the first set of (N+1) SERDES modules of the first IC; and
a second IC including
   a second set of (N+1) SERDES modules configured to communicate with a second set of (N+1) SERDES modules of the switch IC, respectively;
   a second set of N SERDES modules configured to communicate with a second set of N ports of the switch, respectively; and
   a second set of N multiplexer modules configured to communicate with (i) the N SERDES modules in the second set of N SERDES modules, respectively, and (ii) the (N+1) SERDES modules in the second set of (N+1) SERDES modules of the second IC, wherein each multiplexer module in the second set of N multiplexer modules is configured to communicate with a pair of SERDES modules in the second set of (N+1) SERDES modules of the second IC.

2. The system of claim 1, wherein:
a first SERDES module in each of (i) the first set of (N+1) SERDES modules of the switch IC and (ii) the second set of (N+1) SERDES modules of the switch IC is a spare SERDES module;
a first SERDES module in the first set of (N+1) SERDES modules of the first IC is configured to communicate with (i) the spare SERDES module in the first set of (N+1) SERDES modules of the switch IC and (ii) a first multiplexer module in the first set of N multiplexer modules; and
a first SERDES module in the second set of (N+1) SERDES modules of the first IC is configured to communicate with (i) the spare SERDES module in the second set of (N+1) SERDES modules of the switch IC and (ii) a first multiplexer module in the second set of N multiplexer modules.

3. The system of claim 2, wherein:
the first IC further comprises a first management module configured to receive first data from the switch IC to control the first set of N multiplexer modules, wherein each of the N multiplexer modules in the first set of N multiplexer modules is configured, based on the first data, to route data between (i) a corresponding one of the N SERDES modules in the first set of N SERDES modules and (i) one SERDES module from the corresponding pair of SERDES modules in the first set of (N+1) SERDES modules of the first IC; and
the second IC further comprises a second management module configured to receive second data from the switch IC to control the second set of N multiplexer modules, wherein each multiplexer module in the second set of N multiplexer modules is configured, based on the second data, to route data between (i) a corresponding one of the N SERDES modules in the second set of N SERDES modules and (ii) one SERDES module from the corresponding pair of SERDES modules in the second set of (N+1) SERDES modules of the second IC.

4. A switch comprising:
the system of claim 3; and
the switch IC including
   a mapping module configured to
      map, if no SERDES module fails in the first set of (N+1) SERDES modules of the switch IC, SERDES modules except the spare SERDES module in the first set of (N+1) SERDES modules of the switch IC to the first set of N ports of the switch according to a first mapping;
      map, if no SERDES module fails in the second set of (N+1) SERDES modules of the switch IC, SERDES modules except the spare SERDES module in the second set of (N+1) SERDES modules of the switch IC to the second set of N ports of the switch according to a second mapping;
      send the first data corresponding to the first mapping to the first management module; and
      send the second data corresponding to the second mapping to the second management module.

5. The switch of claim 4, wherein the switch IC further comprises:
a failure detection module configured to detect when one SERDES module fails in (i) the first set of (N+1) SERDES modules of the switch IC or (ii) the second set of (N+1) SERDES modules of the switch IC,
wherein the mapping module is further configured to
   if one SERDES module fails in the first set of (N+1) SERDES modules of the switch IC, (i) remap remaining SERDES modules in the first set of (N+1) SERDES modules of the switch IC to the first set of N ports of the switch according to a third mapping and (ii) send the first data corresponding to the third mapping to the first management module; and
   if one SERDES module fails in the second set of (N+1) SERDES modules of the switch IC, (i) remap remaining SERDES modules in the second set of (N+1) SERDES modules of the switch IC to the second set of N ports of the switch according to a fourth mapping and (ii) send the second data corresponding to the fourth mapping to the second management module.

6. A method comprising:
using a first set of (N+1) serializer/deserializer (SERDES) modules of a first integrated circuit (IC) of a switch to communicate with a first set of (N+1) SERDES modules of a switch IC of the switch, respectively, where N is an integer greater than 1;
using a first set of N SERDES modules of the first IC to communicate with a first set of N ports of the switch, respectively;
using a first set of N multiplexer modules of the first IC to communicate with (i) the N SERDES modules in the first set of N SERDES modules, respectively, and (ii) the (N+1) SERDES modules in the first set of (N+1) SERDES modules of the first IC;
using each of the N multiplexer modules of the first IC to communicate with a pair of SERDES modules in the first set of (N+1) SERDES modules of the first IC;
using a second set of (N+1) SERDES modules of a second IC of the switch to communicate with a second set of (N+1) SERDES modules of the switch IC, respectively;

using a second set of N SERDES modules of the second IC to communicate with a second set of N ports of the switch, respectively;

using a second set of N multiplexer modules of the second IC to communicate with (i) the N SERDES modules in the second set of N SERDES modules, respectively, and (ii) the (N+1) SERDES modules in the second set of (N+1) SERDES modules of the second IC; and using each multiplexer module in the second set of N multiplexer modules of the second IC to communicate with a pair of SERDES modules in the second set of (N+1) SERDES modules of the second IC.

7. The method of claim 6, further comprising:

using a first SERDES module in each of (i) the first set of (N+1) SERDES modules of the switch IC and (ii) the second set of (N+1) SERDES modules of the switch IC as a spare SERDES module;

using a first SERDES module in the first set of (N+1) SERDES modules of the first IC to communicate with (i) the spare SERDES module in the first set of (N+1) SERDES modules of the switch IC and (ii) a first multiplexer module in the first set of N multiplexer modules; and using a first SERDES module in the second set of (N+1) SERDES modules of the first IC to communicate with (i) the spare SERDES module in the second set of (N+1) SERDES modules of the switch IC and (ii) a first multiplexer module in the second set of N multiplexer modules.

8. The method of claim 7, further comprising:

controlling the first set of N multiplexer modules based on first data received from the switch IC;

using each of the N multiplexer modules in the first set of N multiplexer modules, based on the first data, to route data between (i) a corresponding one of the N SERDES modules in the first set of N SERDES modules and (i) one SERDES module from the corresponding pair of SERDES modules in the first set of (N+1) SERDES modules of the first IC;

controlling the second set of N multiplexer modules based on second data received from the switch IC; and using each multiplexer module in the second set of N multiplexer modules, based on the second data, to route data between (i) a corresponding one of the N SERDES modules in the second set of N SERDES modules and (ii) one SERDES module from the corresponding pair of SERDES modules in the second set of (N+1) SERDES modules of the second IC.

9. The method of claim 8, further comprising:

mapping, if no SERDES module fails in the first set of (N+1) SERDES modules of the switch IC, SERDES modules except the spare SERDES module in the first set of (N+1) SERDES modules of the switch IC to the first set of N ports of the switch according to a first mapping;

mapping, if no SERDES module fails in the second set of (N+1) SERDES modules of the switch IC, SERDES modules except the spare SERDES module in the second set of (N+1) SERDES modules of the switch IC to the second set of N ports of the switch according to a second mapping;

controlling the first set of N multiplexer modules based on the first data corresponding to the first mapping; and controlling the second set of N multiplexer modules based on the second data corresponding to the second mapping.

10. The method of claim 9, wherein the switch IC further comprises:

detecting when one SERDES module fails in (i) the first set of (N+1) SERDES modules of the switch IC or (ii) the second set of (N+1) SERDES modules of the switch IC;

if one SERDES module fails in the first set of (N+1) SERDES modules of the switch IC, (i) remapping remaining SERDES modules in the first set of (N+1) SERDES modules of the switch IC to the first set of N ports of the switch according to a third mapping and (ii) controlling the first set of N multiplexer modules based on the first data corresponding to the third mapping; and if one SERDES module fails in the second set of (N+1) SERDES modules of the switch IC, (i) remapping remaining SERDES modules in the second set of (N+1) SERDES modules of the switch IC to the second set of N ports of the switch according to a fourth mapping and (ii) controlling the second set of N multiplexer modules based on the second data corresponding to the fourth mapping.

* * * * *